United States Patent
Sekiguchi et al.

(10) Patent No.: US 8,164,712 B2
(45) Date of Patent: Apr. 24, 2012

(54) LIQUID CRYSTAL DISPLAY DEVICE

(75) Inventors: Yoshifumi Sekiguchi, Hitachiota (JP);
Yoshinori Aono, Kokubunji (JP);
Masaki Tsubokura, Mobara (JP)

(73) Assignees: Hitachi Displays, Ltd., Chiba-ken (JP);
Panasonic Liquid Crystal Display Co., Ltd., Hyogo (JP)

( * ) Notice: Subject to any disclaimer, the term of this patent is extended or adjusted under 35 U.S.C. 154(b) by 209 days.

(21) Appl. No.: 12/192,181

(22) Filed: Aug. 15, 2008

(65) Prior Publication Data

US 2009/0086121 A1    Apr. 2, 2009

(30) Foreign Application Priority Data

Sep. 28, 2007 (JP) ................. 2007-252971
Oct. 12, 2007 (JP) ................. 2007-266021

(51) Int. Cl.
*G02F 1/13357* (2006.01)
(52) U.S. Cl. ........................................ 349/70
(58) Field of Classification Search ............ None
See application file for complete search history.

(56) References Cited

U.S. PATENT DOCUMENTS

| | | | |
|---|---|---|---|
| 5,726,722 A * | 3/1998 | Uehara et al. | 349/66 |
| 2008/0002098 A1 | 1/2008 | Imajo et al. | |
| 2008/0049167 A1 | 2/2008 | Abo et al. | |
| 2008/0252810 A1 * | 10/2008 | Ito et al. | 349/60 |

FOREIGN PATENT DOCUMENTS

| | | |
|---|---|---|
| JP | 6-273765 | 9/1994 |
| JP | 2006-032358 | 2/2006 |
| JP | 2007-041422 | 2/2007 |
| JP | 2007-184232 | 7/2007 |
| JP | 2007-233028 | 9/2007 |
| JP | 2008-014984 | 1/2008 |
| JP | 2008-052114 | 3/2008 |
| JP | 2008-058851 | 3/2008 |

* cited by examiner

*Primary Examiner* — Mike Stahl
(74) *Attorney, Agent, or Firm* — Antonelli, Terry, Stout & Kraus, LLP.

(57) ABSTRACT

A liquid crystal display device includes a backlight device, a liquid crystal panel and a light source unit. The light source unit includes a case having an opening surface, a fluorescent tube, an electric holder, and a cover member. The cover member includes a shield plate, a fixed groove and an overhanging portion, wherein the overhanging portion is provided at an edge of the fixed groove and on a side of the liquid crystal panel with respect to the fluorescent tube which includes a portion which extends through the fixed groove. A portion of the cover member includes a protrusion which is a separate member from the overhanging portion and which extends more toward the liquid crystal panel than a surface portion of the overhanging portion.

14 Claims, 11 Drawing Sheets

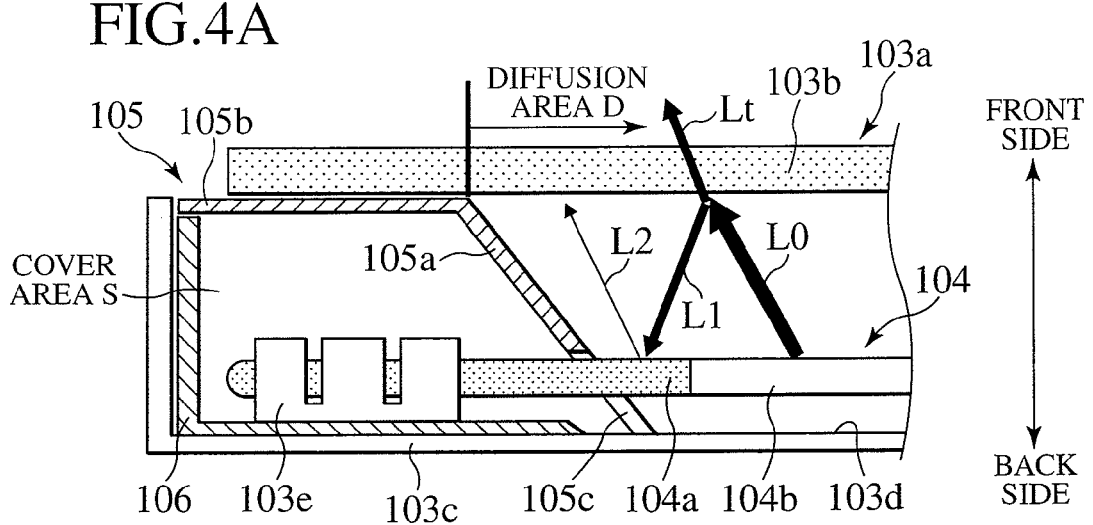
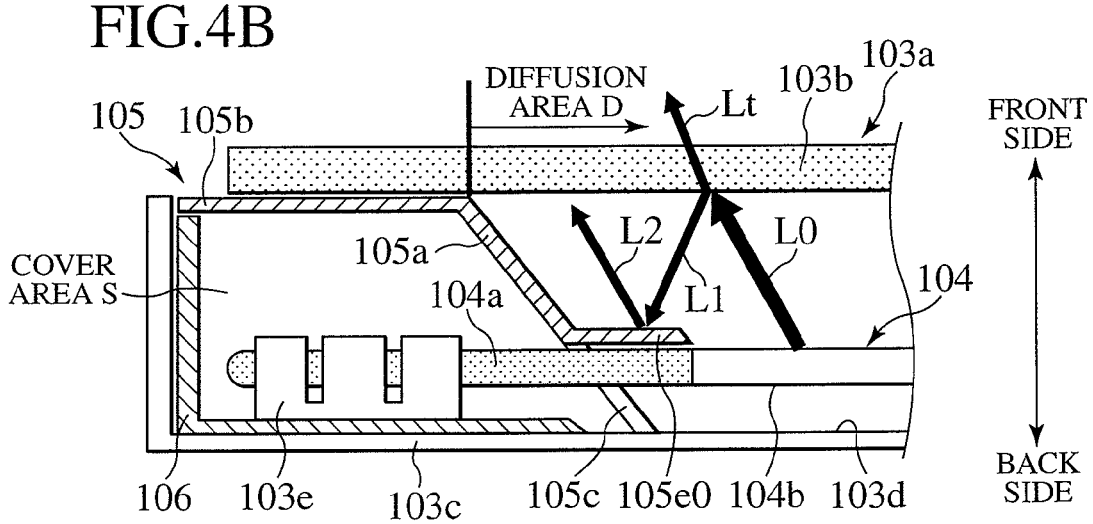
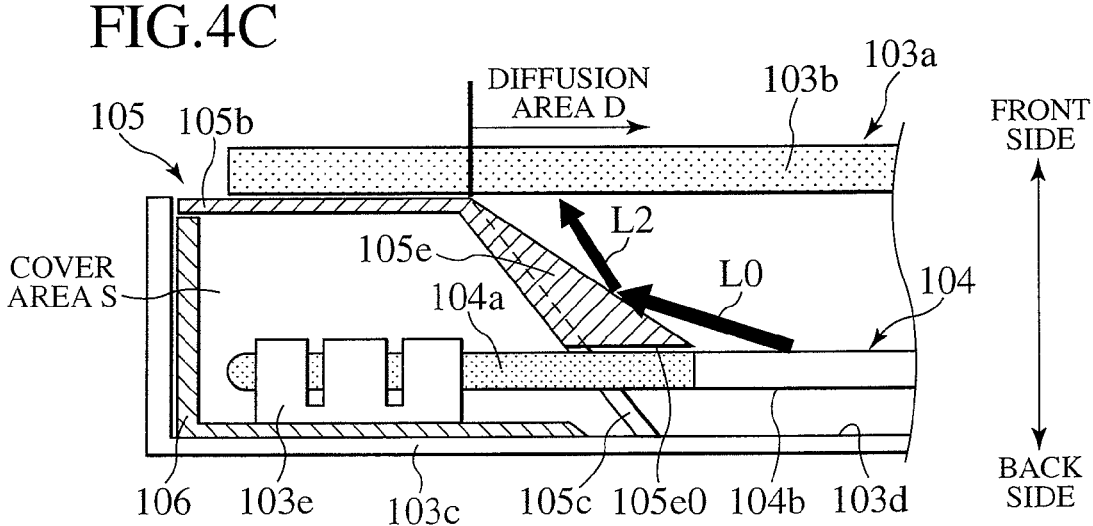

LIQUID CRYSTAL DISPLAY DEVICE

BACKGROUND OF THE INVENTION

1. Field of the Invention

The present invention relates to a liquid crystal display device.

2. Description of the Related Art

In recent years, light emitting type plasma display devices and non-light emitting type liquid crystal display devices have been used as display devices in place of cathode ray tubes (CRTs).

A typical one of the liquid crystal display devices includes a liquid crystal panel and an illuminating device (hereinafter referred to as a backlight device). The liquid crystal panel is used as a transmissive light modulation device. The backlight device is located on the back side of the liquid crystal panel and illuminates the liquid crystal panel with light. The transmittance of the light emitted by the back light device is controlled by the liquid crystal panel, thereby forming an image on the liquid crystal panel.

A typical liquid crystal display device has a small thickness compared with CRTs. This is one of the features of the liquid crystal display device. However, there has been a demand for further reduction of the thickness of the liquid crystal display device in recent years. Due to the demand, it has been requested to reduce the thickness of a backlight device provided in the liquid crystal display device. In relation to such a backlight device provided in a typical liquid crystal display device, JP-A-2007-184232 (refer to paragraph 0052) discloses a backlight device using an external electrode fluorescent lamp (EEFL), and JP-A-2006-032358 (refer to paragraph 0016) discloses a backlight device using a cold cathode fluorescent lamp (CCFL).

SUMMARY OF THE INVENTION

The EEFL and CCFL are long thin fluorescent tubes. As described in JP-A-2007-184232 and JP-A-2006-032358, it is possible that a backlight device using a fluorescent tube such as an EEFL or a CCFL has a small thickness. However, each of fluorescent tubes such as the EEFL, CCFL and a hot cathode fluorescent lamp (HCFL) has both edge portions with extremely low luminance. When such fluorescent tubes are used, regions of a display panel, which correspond to the edge portions of the fluorescent tubes, are dark. This results from the fact that electrodes are provided at the edge portions.

In a conventional technique, substantially constant luminance can be achieved across a diffuser board by diffusing light output from a fluorescent tube in a space between the fluorescent tube and the diffuser board provided on the front side of a backlight device.

When the backlight device has a smaller thickness, however, the distance between the fluorescent tube and the diffuser board is smaller. In this case, the light output from the fluorescent tube cannot be sufficiently diffused. Lack of luminance at edge portions of the fluorescent tube conduces to non-uniform luminance across the diffuser board. This results in the fact that both edge portions of the diffuser board, which corresponds to the edge portions of the fluorescent tube, are dark.

When both edge portions of the fluorescent tube are dark, both edge portions of a liquid crystal panel provided on the front side of the diffuser board are also dark. Due to the darkness, stripe-like irregularity may occur in both edge portions of an image displayed by a liquid crystal display device.

It is, therefore, an object of the present invention to provide a liquid crystal display device having a backlight device capable of illuminating a liquid crystal panel in an excellent manner even when the liquid crystal display device has a thin structure.

To accomplish the object, a liquid crystal display device according to an aspect of the present invention includes a liquid crystal panel and a light source unit for illuminating the liquid crystal panel from the back side of the liquid crystal panel. The light source unit includes a case, a fluorescent tube, an electrode holder, and a cover member. The case has an opening surface. The fluorescent tube is provided in the case and has a longitudinal axis. The electrode holder is provided in the case and adapted to hold an electrode section provided in an edge portion of the fluorescent tube. The cover member has a shield plate, a fixed groove and an overhanging portion. The shield plate shields the electrode holder from a diffusion area in which light emitted by a light emitting section of the fluorescent tube is scattered. The fluorescent tube extends through the fixed groove. The overhanging portion is provided at an edge of the fixed groove and on the side of the liquid crystal panel with respect to the fluorescent tube, faces the fluorescent tube, and protrudes toward the inside of the case and in the direction of the longitudinal axis of the fluorescent tube. When a plane which includes the overhanging portion and is perpendicular to a surface of the liquid crystal panel is S1; a plane which includes a portion of the shield plate and is perpendicular to the surface of the liquid crystal panel is S2, the portion of the shield plate being located between the fluorescent tubes adjacent to each other (the portion of the shield plate not including the overhanging portion); and a plane which includes the overhanging portion and is parallel to the surface of the liquid crystal panel is S3, a cross sectional shape of a portion of the cover member, which is taken along the plane S1 and located on the side of the liquid crystal panel with respect to the plane S3, is different from a cross sectional shape of a portion of the cover member, which is taken along the plane S2 and located on the side of the liquid crystal panel with respect to the plane S3.

According to another aspect of the present invention, the cover member has the fixed groove through which the fluorescent tube extends. The overhanging portion is provided at the edge of the fixed groove and on the side of the liquid crystal panel with respect to the fluorescent tube, faces the fluorescent tube, and protrudes toward the inside of the case and in the direction of the longitudinal axis of the fluorescent tube. The overhanging portion has a surface substantially parallel to the surface of the liquid crystal panel and a surface substantially perpendicular to the surface of the liquid crystal panel. The surface of the overhanging portion, which is substantially parallel to the surface of the liquid crystal panel, extends more toward the inside of the case and in the direction of the longitudinal axis of the fluorescent tube than the surface of the overhanging portion, which is substantially perpendicular to the surface of the liquid crystal panel.

According to still another aspect of the present invention, a reflector is provided on the side of the liquid crystal panel with respect to the overhanging portion and protrudes toward the liquid crystal panel.

According to yet still another aspect of the present invention, when sections present on the boundary between the upper surface which is substantially parallel to the liquid crystal panel and the shield plate which directs from the upper surface to the bottom surface of the case are defined as diffusion area start sections, at least one of the diffusion area start sections, which is present at top and bottom edge portions of the cover member, is located on the outer side of the case with respect to the other diffusion area start section present around the center of the boundary between the upper surface and the shield plate of the cover member. The cover member is located near the left and right end portions of the liquid crystal panel.

According to yet still another aspect of the present invention, a white elastic body is provided between the fixed groove and the fluorescent tube.

The present invention provides a liquid crystal display device having a backlight device capable of illuminating a liquid crystal panel in an excellent manner even when the liquid crystal display device has a thin structure.

BRIEF DESCRIPTION OF THE DRAWINGS

Other objects and advantages of the invention will become apparent from the following description of embodiments with reference to the accompanying drawings in which:

FIGS. 4A to 4C are diagrams each showing an example of the cross sectional structure of the back light device according to the first embodiment of the present invention;

DESCRIPTION OF THE PREFERRED EMBODIMENTS

Embodiments of the present invention will be described with reference to the accompanying drawings.

First Embodiment

Figure 1:
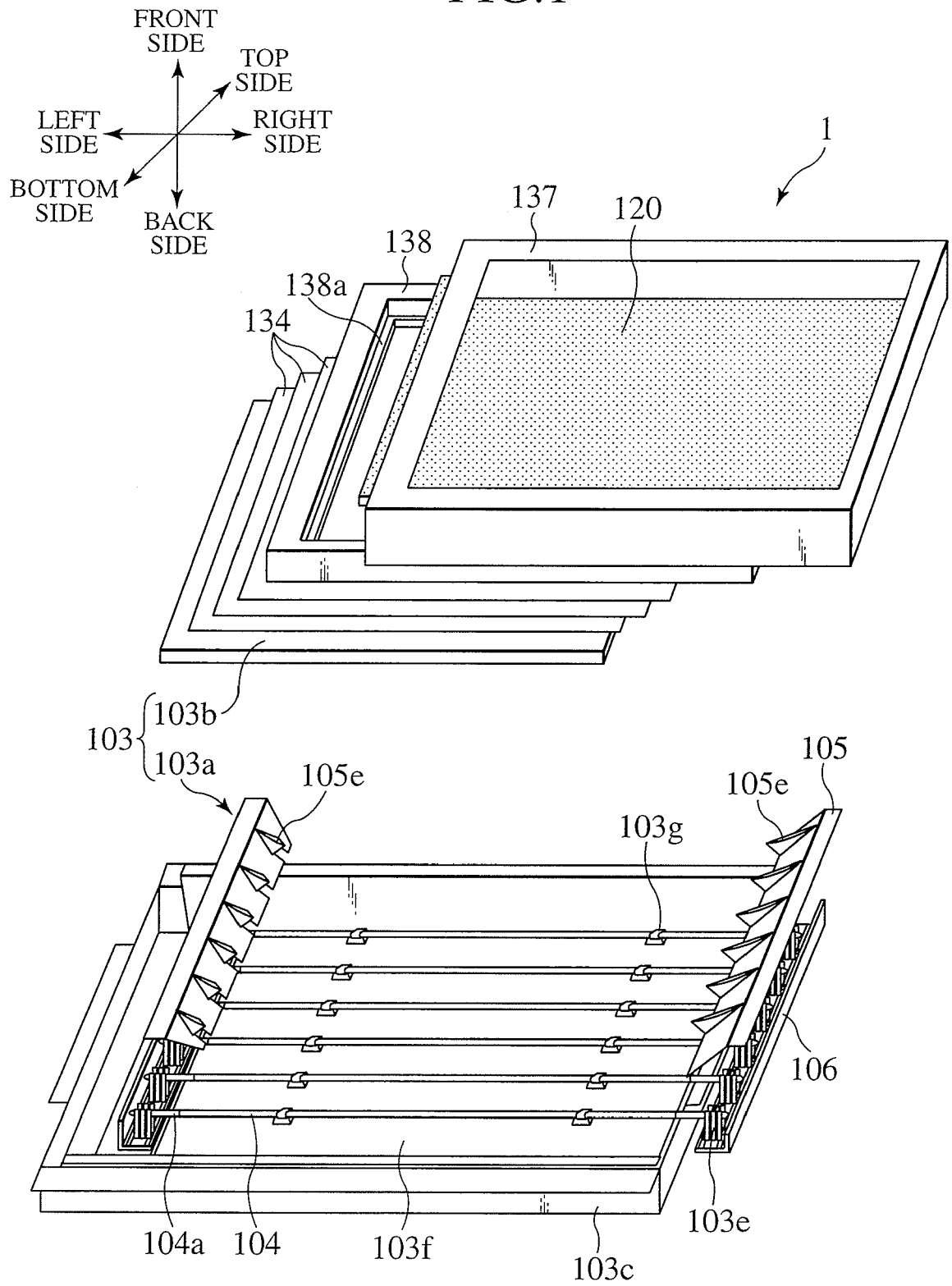
FIG. 1 is a perspective view of a liquid crystal display device according to a first embodiment of the present invention.
Figure 2A:
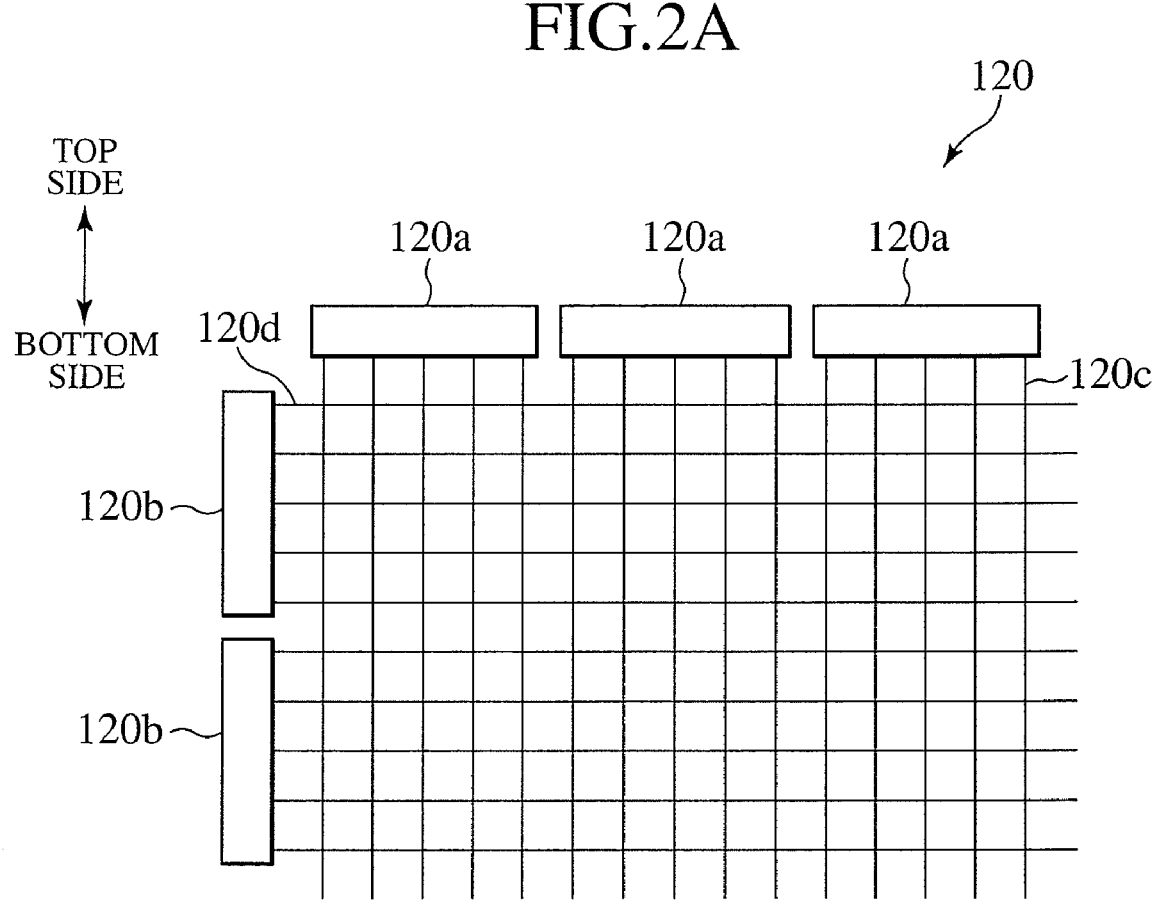
FIG. 2A is a diagram showing wirings and drivers of a liquid crystal panel according to the present invention.
Figure 2B:
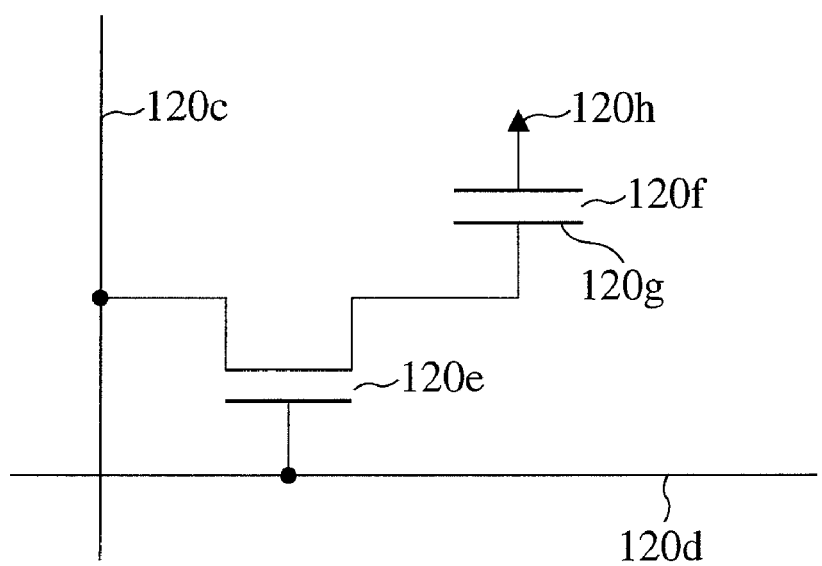
FIG. 2B is a diagram showing a thin film transistor (TFT) and a pixel electrode of the liquid crystal panel according to the present invention.

FIG. 1 is a perspective view of a liquid crystal display device according to the first embodiment of the present invention. FIG. 2A is a diagram showing wirings and drivers of a liquid crystal panel according to the present invention. FIG. 2B is a diagram showing a thin film transistor (TFT) and a pixel electrode of the liquid crystal panel according to the present invention. In the first embodiment, a top side, a bottom side, a right side, a left side, a front side, and a back side are defined in reference to a display surface of the liquid crystal panel 120 as shown in FIG. 1. A direction connecting the right side and the left side is defined as a right-left direction (X direction). A direction connecting the top side and the bottom side is defined as a top-bottom direction (Y direction). A direction connecting the front side and the back side is defined as a front-back direction (Z direction). The Z direction is parallel to a normal to the display surface of the liquid crystal panel 120. The X and Y directions are parallel to the display surface of the liquid crystal panel 120.

As shown in FIG. 1, a liquid crystal display device 1 according to the first embodiment is mainly composed of the liquid crystal panel 120 and a back light device 103. The liquid crystal display device 1 includes an upper frame 137, a middle frame 138, and optical sheets 134.

The liquid crystal display device 1 further includes a controller (not shown) and a driver (not shown). The controller controls the liquid crystal display device 1. The driver has a DC-DC power supply for supplying a power supply voltage to the backlight device 103 and the like. The controller controls the liquid crystal panel 120, the backlight device 103 and the like. In addition, the controller processes an image to be displayed by the liquid crystal display device 1. The controller includes a computer, a program, and peripheral circuits. The computer included in the controller has a central processing unit (CPU), a random access memory (RAM), and a read only memory (ROM). The controller is driven by a program stored in the ROM.

The upper frame 137 is made of metal such as iron or aluminum and is provided on the front side of the liquid crystal panel 120. The upper frame 137 serves as a front cover for the liquid crystal display device 1. In addition, the upper frame 137 has an opening in which a display area of the liquid crystal display device 1 is present.

The middle frame 138 is made of resin and is provided on the back side of the liquid crystal panel 120. The middle frame 138 serves to fix the liquid crystal panel 120. The middle frame 138 has an opening at a central portion thereof to allow the backlight device 103 provided on the back side of the liquid crystal panel 120 to illuminate the liquid crystal panel 120. The middle frame 138 has a groove 138a provided around the opening thereof.

The liquid crystal panel 120 is engaged with the groove 138a of the middle frame 138. The upper frame 137 covers the middle frame 138 and the like and is fixed to a lower frame 103c.

The backlight device 103 is mainly composed of a light source unit 103a and a diffuser board 103b. The light source unit 103a is composed of fluorescent tubes 104 such as EEFLs. The lower frame 103c has an opening surface. The fluorescent tubes 104 are juxtaposed to each other in a longitudinal direction of the lower frame 103c. The diffuser board 103b covers the opening surface of the lower frame 103c. The lower frame 103c serves as a case of the light source unit 103a.

The backlight device 103 further includes an inverter (not shown) for driving the fluorescent tubes 104.

In the present embodiment, the fluorescent tubes 104 are EEFLs. It should be noted that each of the fluorescent tubes 104 is not limited to the EEFL and may be another fluorescent tube such as a CCFL or a HCFL (Hot Cathode Fluorescent Lamp). In FIG. 1, the number of the fluorescent tubes 104 is six. The number of the fluorescent tubes 104, however, is not limited to six. When the liquid crystal panel 120 has a diagonal of 32 inches and the fluorescent tubes 104 are EEFLs or CCFLs, the necessary number of the fluorescent tubes 104 is 16 to 20. When the liquid crystal panel 120 has a diagonal of 32 inches and the fluorescent tubes 104 are HCFLs, the necessary number of the fluorescent tubes 104 is 3 to 10. Portions of the HCFL, which are present around electrodes, become black as the time of use of the HCFL increases. Thus, both edge portions of the HCFL become dark as the time of use of the HCFL increases. It is, therefore, necessary that HCFLs be designed in consideration of portions which become black as the time of use of the HCFLs increases. In the case of the CCFL is used, light is not emitted in the area between an edge portion of the fluorescent tube and an electrode provided in a glass tube. In both cases where the CCFL is used and where the HCFL is used, the edge portions of the fluorescent tube may become dark. Especially when a frame of a liquid crystal television has a small thickness, the abovementioned problem is remarkable.

Tube holders 103g are fixed to the inside of the lower frame 103c. Part of a reflective sheet 103f is sandwiched between the lower frame 103c and the tube holders 103g and fixed to the lower frame 103c. The fluorescent tubes 104 are held by and fixed to the tube holders 103g to ensure that a predetermined distance between each of the fluorescent tubes 104 and the reflective sheet 103f is maintained. Lower side molds 106 are fixed to the lower frame 103c. Each of the fluorescent tubes 104 has electrode sections 104 formed at both edge portions thereof. Each of the lower side molds 106 is provided with electrode holders 103e fixed thereto. The electrode holders 103e are adapted to hold the respective electrode sections 104a. Upper side molds 105 cover the respective lower side molds 106. The diffuser board 103b is fixed to the upper side molds 105.

In the first embodiment, each of the upper side molds 105 has reflectors 105e formed thereon.

The reflective sheet 103f provided inside the lower frame 103c is adapted to diffusely reflect light output from the fluorescent tubes 104 toward the front side of the liquid crystal panel 120 in an efficient manner. The diffuser board 103b is provided on the front side of the liquid crystal panel 120 with respect to the lower frame 103c. The diffuser board 103b diffusely transmits a component of the light output from the fluorescent tubes 104 while diffusely reflecting another component of the light output from the fluorescent tubes 104. In this configuration, while a component of the light output from the fluorescent tubes 104 is repeatedly diffusely reflected between the reflective sheet 103f and the diffuser board 103b a plurality of times, and another component of the light is output from the diffuser board 103b and incident on the liquid crystal panel 120. A plurality of the optical sheets 134 (three optical sheets 134 are provided in FIG. 1) is provided on the front side of the liquid crystal panel 120 with respect to the diffuser board 103b. After the light output from the fluorescent tubes 104 is repeatedly diffusely reflected between the reflective sheet 103f and the diffuser board 103b and is output from the diffuser board 103b, a diffusion property and directionality of the light is controlled by the optical sheets 134.

The optical sheets 134 are provided on the back side of the liquid crystal panel 120 with respect to the middle frame 138. Each of the optical sheets 134 has a function for providing directionality in order to uniformly diffuse light emitted by the backlight device 103 to the display surface of the liquid crystal panel 120 or increase luminance of light propagating in the Z direction (front-back side direction). The number of the optical sheets 134 is not limited although the three optical sheets 134 are drawn in FIG. 1.

The thus constructed backlight device 103 is arranged on the back side of the liquid crystal panel 120 and has a function for illuminating the liquid crystal panel 120 from the back side of the liquid crystal panel 120.

The liquid crystal panel 120 has two glass substrates between which a liquid crystal is provided. The liquid crystal panel 120 has a function as a light shutter for controlling transmission and blocking of light output from the backlight device 103 through the control of orientations of liquid crystal molecules constituting the liquid crystal.

Referring to FIG. 2A, the liquid crystal panel 120 has data lines 120c and gate lines 120d arranged in a matrix pattern. Also, the liquid crystal panel 120 has a source driver 120a and a gate driver 120b. The source driver 120a drives the data lines 120c, and the gate driver 120b drives the gate lines 120d.

As shown in FIG. 2B, a TFT 120e is connected at an intersection of each of the data lines 120c and each of the gate lines 120d and drives a liquid crystal section 120f. In FIG. 2B, when a positive voltage is applied to the gate line 120d, the TFT 120e electrically connects the data line 120c and a pixel electrode 120g. In this case, a voltage is applied to the pixel electrode 120g from the data line 120c based on image data, and a shutter of the liquid crystal section 120f is opened or closed based on a voltage applied between the pixel electrode 120g and a common electrode 120h. When the shutter of the liquid crystal section 120f is opened, the liquid crystal section 120f transmits light output from the backlight device 103 shown in FIG. 1 to allow a pixel corresponding to the liquid crystal section 120f to be bright. When the shutter of the liquid crystal section 120f is closed, the pixel becomes dark.

The relationship between the opening or closing of the shutter of the liquid crystal section 120f and the voltage (which is nearly equal to a voltage applied between the pixel electrode 120g and the common electrode 120h) applied to the liquid crystal section 120f is dependent on a display mode of the liquid crystal section 120f. In a display mode of the liquid crystal panel 120 for a typical television receiver, a pixel corresponding to the liquid crystal section 120f is bright when an absolute value of a voltage applied to the liquid crystal section 120f is large (approximately 5 volts), and the pixel is dark when the absolute value is small (approximately 0 volts). Within the range from 0 volts to 5 volts, the larger the absolute value of the voltage, the brighter the pixel. The brightness level of the pixel, however, is not changed linearly with respect to the absolute value of the voltage. The division of the range of the absolute value ranging from 0 volts to 5 volts into intervals makes it possible to perform multiple-tone display. The present invention, however, is not limited to the abovementioned display mode.

Referring again to FIG. 2B, when a negative voltage is applied to the gate line 120d connected to the TFT 120e, high resistance is generated between the data line 120c and the pixel electrode 120g. In this case, the voltage applied to the liquid crystal section 120f is maintained.

In this way, the liquid crystal section 120f is controlled by a voltage applied to the gate line 120d and a voltage applied to the data line 120c.

The gate driver 120b has a function for sequentially scanning gate lines 120d (for example, from the gate line provided on the top side to the gate line provided on the bottom side as shown in FIG. 2A) at a constant interval to apply a predetermined voltage to one of the gate lines 120d. The source driver 120a respectively supplies, to the data lines 120c, voltages necessary for respective pixels connected to the gate line 120*d* to which the predetermined voltage is applied by the gate driver 120*b*.

In the liquid crystal panel 120 having the abovementioned configuration, a bright pixel and a dark pixel can be set simultaneously by means of the gate line 120*d* to which a voltage is applied. The gate driver 120*b* scans the gate lines 120*d* while the source driver 120*a* controls voltages to be applied to the respective data lines 120*c*. Thus, bright pixels and dark pixels can be set by means of all the gate lines 120*d*. The liquid crystal panel 120 can therefore display an image in the abovementioned way.

It should be noted that the controller (not shown) provided in the liquid crystal display device 1 (refer to FIG. 1) may control the source driver 120*a* and the gate driver 120*b*.

The controller (not shown) has a function for controlling an image signal to be displayed on the liquid crystal panel 120 as information on brightness for each liquid crystal section 120*f* (refer to FIG. 2B). The controller may control the gate driver 120*b* to cause the gate driver 120*b* to scan the gate lines 120*d* from the top-side gate line 120*d* to the bottom-side gate line 120*d* in order to apply a predetermined voltage to one of the gate lines 120*d*, and control the source driver 120*a* to cause the source driver 120*a* to apply predetermined voltages to the respective data lines 120*c* based on the information on brightness for the data lines 120*c* connected to the respective TFTs 120*e*, which are connected to the gate line 120*d* to which the predetermined voltage is applied.

Figure 3:
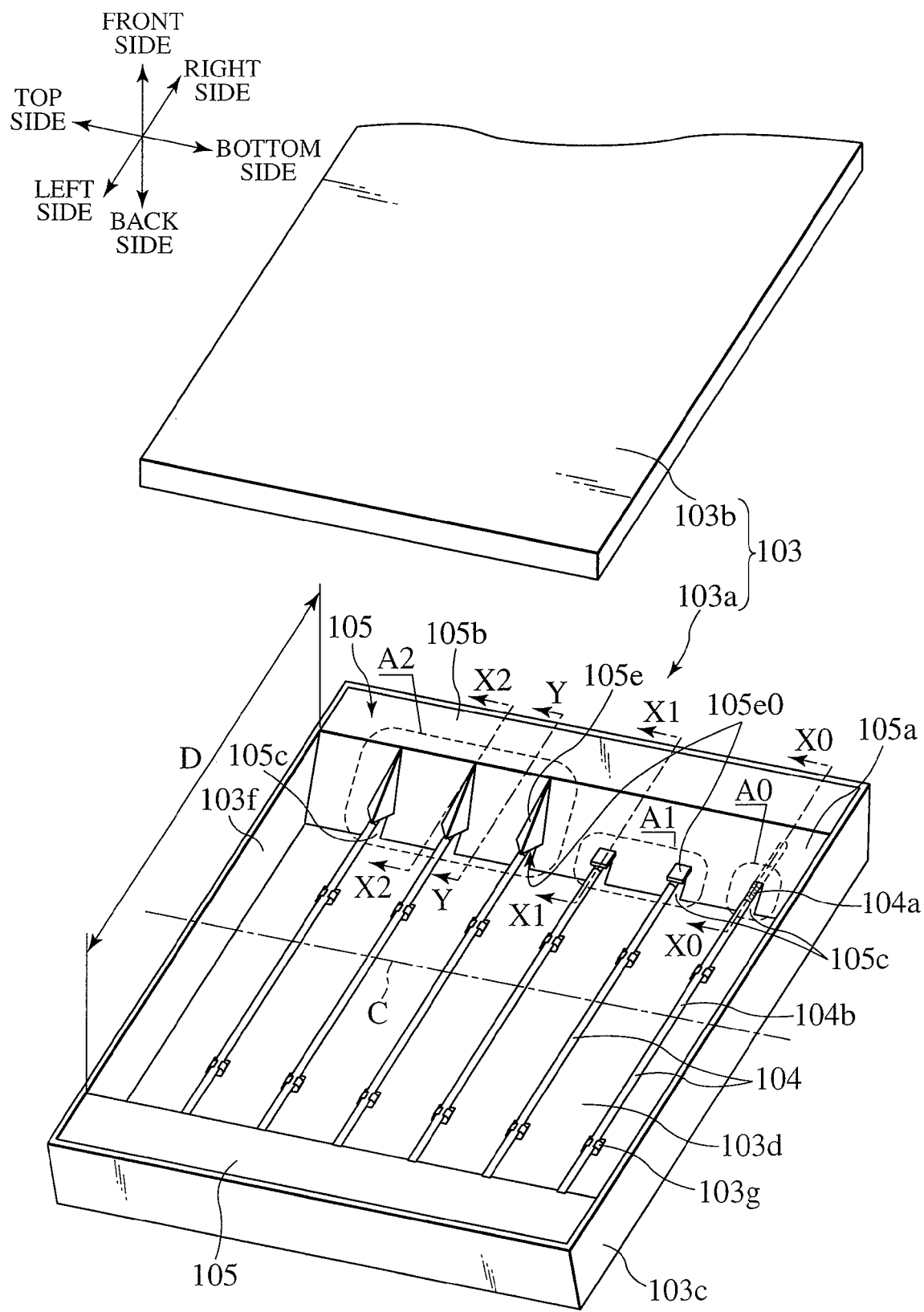
FIG. 3 is a perspective view of the entire configuration of a back light device according to the present invention.

FIG. 3 is a diagram showing the backlight device 103. The backlight device 103 includes the diffuser board 103*b* and the light source unit 103*a* as shown in FIG. 3. The lower frame 103*c* constituting the case of the light source unit 103*a* is provided with the opening surface facing the front side of the liquid crystal panel 120 and has a shallow box structure. A plurality of the fluorescent tubes 104 (six fluorescent tubes in FIG. 3) is arranged above a bottom surface 103*d* of the lower frame 103*c*. The bottom surface 103*d* is the opening surface. The lower frame 103*c* may be formed of metal such as iron by sheet metal processing or may be formed of resin. The material of the lower frame 103*c*, however, is not limited to the above. The lower frame 103*c* preferably has a reflective surface (for reflecting light) formed inside thereof in order that light output from the fluorescent tubes 104 is efficiently illuminated to the front side. The reflective sheet 103*f* is therefore provided inside the lower frame 103*c* as described above.

For a reflective surface, a white or silver coating material having high reflectance may be coated in place of the reflective sheet 103*f*.

The light source unit 103*a* according to the present embodiment has the reflectors 105*e*.

The diffuser board 103*b* is made of resin such as acrylic and adapted to diffusely reflect and diffusely transmit light output from the fluorescent tubes 104.

The upper side molds (cover members) 105 are provided in the lower frame 103*c* on the right and left sides of the lower frame 103*c* and fixed by screws or the like. The upper side molds 105 are made of resin or the like. Each of the upper side molds 105 has an upper surface 105*b* and a shield plate 105*a*. The upper surfaces 105*b* are parallel to the bottom surface 103*d* of the lower frame 103*c*. The shield plates 105*a* are formed to extend from the respective upper surfaces 105*b* to the bottom surface 103*d* of the lower frame 103*c*. The reflective sheet 103*f* is omitted in some of the drawings and in some descriptions. The reflective sheet 103*f*, however, covers the bottom surface 103*d* of the lower frame 103*c*. When the lower frame 103*c* is made of white resin or the like, the reflective sheet 103*f* may not be provided. The shield plates 105*a* (facing to each other) of the upper side molds 105 provided on the right and left sides of the lower frame 103*c*, and a space present between the shield plates 105*a* constitute a diffusion area D, which is surrounded by the lower frame 103*c*. The diffusion area D is larger by several millimeters square than an area (shown in FIG. 1) in which the liquid crystal panel 120 displays an image. The backlight device 103 illuminates the diffusion area D to illuminate the liquid crystal panel 120 from the back side of the liquid crystal panel 120.

An alternate long and short dash line C shown in FIG. 3 indicates the center of the distance between the two shield plates 105*a* which are provided in the lower frame 103*c* and face to each other. That is, the alternate long and short dash line C indicates a center line dividing the diffusion area D in the right-left direction. It is deemed that the alternate long and short dash line C is substantially the same as a center line of the lower frame 103*c*.

The upper side molds 105 preferably has a function for reflecting and scattering light output from the fluorescent tubes 104 toward the diffuser board 103*b*. The upper side molds 105 are preferably made of resin having high reflectance.

Each of the shield plates 105*a* has fixed grooves 105*c* through which the respective fluorescent tubes extend. The number of the fixed grooves 105*c* of each of the shield plates 105*a* is the same as that of the fluorescent tubes 104. As shown in FIG. 3, edge portions of the fluorescent tubes 104 extend through the respective fixed grooves 105*c*. Each of the fluorescent tubes 104 has a light emitting section 104*b* for emitting light and electrode sections 104*a* provided at both edge portions thereof. Each of the electrode sections 104*a* does not emit light. The electrode sections 104*a* extend through the respective fixed grooves 105*c*.

In FIG. 3, areas A0, A1 and A2, each of which is surrounded by a dashed line, indicate respective shapes of the shield plate 105*a*, which are different from each other, and located in the vicinity of at least one of the fixed grooves 105*c*. That is, three types of the shapes of the shield plate 105*a* are shown. In FIG. 3, the three types of shapes of the shield plate 105*a* are shown in the backlight device 103 for simplifying the description and the drawing. The actual shield plate 105*a* has a single-type shape in the vicinities of the fixed grooves 105*c* as shown in FIG. 1 (in which the reflectors 105*e* having the same shape are provided for the respective fixed grooves 105*c*).

The shape present in the area A0 indicates a shape of a conventional backlight device 103 in the vicinity of the fixed groove 105*c*. In the area A0, only the fixed groove 105*c* is provided. A portion of the electrode section 104*a* protrudes into the diffusion area. In general, the electrode sections 104 of each of the fluorescent tubes 104 (which are EEFLs in the present embodiment) are made of a metal material having low reflectance. Therefore, when each of the electrodes section 104 receives light, the electrode section 104 absorbs the light, resulting in an effect in which an area around the electrode section 104*a* becomes dark.

The conventional backlight device has a sufficient diffusion distance of approximately 20 millimeters (mm), which is between the bottom surface 103*d* and the diffuser board 103*b*. In the conventional backlight device, therefore, the abovementioned effect is almost not perceived.

When the diffusion distance is set to approximately 10 mm (the thickness of the light source unit 103*a* is reduced), irregularity due to a black smear occurs on a display area of the liquid crystal display device 1 (refer to FIG. 1) at a location corresponding to the electrode sections. According to the result of an experiment, it is found out that the irregularity occurring due to the black smear degrades the quality of a displayed image. This results from the fact that when the diffusion distance is reduced, the effect (in which an area around the electrode section 104a becomes dark due to the low reflectance of the electrode section 104a) is noticeable.

When the light source unit 103a has a large thickness and has a sufficient distance between the fluorescent tube 104 and the diffuser board 103b, light having substantially constant luminance is uniformly distributed across the diffuser board 103b by scattering the light from the diffusion area D of the lower frame 103c. This results in the fact that edge portions of the liquid crystal panel 120 (refer to FIG. 1) are bright. When the light source unit 103a has a small thickness, the lower frame 103c also has a small thickness. In this case, the distance between each of the fluorescent tubes 104 and the diffuser board 103b is reduced. When the distance between each of the fluorescent tubes 104 and the diffuser board 103b is small, light output from the fluorescent tubes 104 is not sufficiently diffused. This results in the fact that luminance of light distributed across the diffuser board 103b is not constant. Therefore, the effect (in which an area around the electrode section 104a is dark) is noticeable. Another problem arises in that irregularity may occur due to a smear at a location corresponding to the area around the electrode section 104a when the light source unit 103a has a small thickness.

The area A1 indicates the structure of the shield plate 105a. In the area A1, an overhanging portion 105e0 is attached to an edge portion of each of the fixed grooves 105c and located on the front side of the liquid crystal panel 120 with respect to the corresponding fluorescent tube 104. The overhanging portions 105e0 are integrated with the corresponding upper side mold 105. In this case, a portion of each of the electrode sections 104, which is present on the side of the liquid crystal panel 120, is covered with white resin having higher reflectance than that of the electrode section 104a. This structure shown in the area A1 makes it possible to reduce irregularity occurring due to a black smear. When the light source unit 103a has a small thickness, however, this structure does not necessarily prevent the irregularity. For example, when a portion (having a length of 2 mm or more) of the electrode section 104a protrudes into the diffusion area D (the overhanging portion 105e0 has a length of 2 mm or more), a portion of a displayed image, which corresponds to an area around the electrode section 104a, is slightly dark.

The area A2 indicates a structure in which the reflectors 105e are provided on the front side of the liquid crystal panel 120 with respect to the respective overhanging portions 105e0. Each of the reflectors 105e has a surface serving as the overhanging portion 105e0. The surface of each of the reflectors 105e faces the electrode section 104a. Each of the reflectors 105e has a three dimensional structure with three surfaces. The other two surfaces of each of the reflectors 105e face the diffuser board 103b and are formed at a constant angle with respect to the surface of the shield plate 105a. In addition, the two surfaces of each of the reflectors 105e are adapted to reflect light emitted by the light emitting section 104b toward a portion of the diffuser board 103b, which is present in the vicinity of the electrode section 104a. Each of the reflectors 105e has the following features: the reflectors 105e are arranged on the surface of the cover member and located on the side of the liquid crystal panel 120 with respect to the overhanging portions 105e0; each of the reflectors 105e has the two reflective surfaces; and a plane, which includes the boundary between the two reflective surfaces and is perpendicular to the surface of the liquid crystal panel 120, includes an area present around the center of the fluorescent tube 104. In this case, the center of the fluorescent tube 104 is determined in the cross section of the fluorescent tube 104 taken along a plane parallel to the top-bottom direction and to the front-back direction. In addition, the two reflective surfaces are symmetrical to a plane (perpendicular to the display surface of the liquid crystal panel 120) having a normal parallel to the abovementioned top-bottom direction.

In the thus constructed light source unit 103a, the reflectors 105e are provided for the respective fixed grooves 105c, through which the respective edge portions of the fluorescent tubes 104 extend, and capable of reflecting light propagating from the top side toward the diffuser board 103b and reflecting light propagating from the bottom side toward the diffuser board 103b. Since the reflectors 105e face the respective electrode sections 104a (the reflectors 105e are located on the front side of the liquid crystal panel 120 with respect to the respective overhanging portions 105e0), light reflected on the reflectors 105e looks like light output from the electrode sections 104a. This suppresses irregularity due to a smear caused by the electrode sections 104a.

The reflectors 105e are integrated with the upper side mold 105. The capability of each of the reflectors 105e is dependent on a material of each of the upper side molds 105 and a method for finishing the upper side molds 105 to some extent. The material of the upper side molds 105 preferably has high reflectance. The method for finishing the upper side molds 105 is preferably a mirror finishing method. Each of the reflectors 105e finished by the mirror finishing method is effective to efficiently reflect light to a predetermined location (a portion of the diffuser board 103b, which is present in the vicinity of the corresponding electrode section 104a). Even when the reflectors 105e are not finished by the mirror finishing method, each of the reflectors 105e (having the surface facing the corresponding electrode section 104a (the fluorescent tube 104) and provided on the front side of the liquid crystal panel 120 with respect to the fluorescent tube 104) is capable of reflecting light to the diffuser board 103b to achieve a sufficient effect.

FIG. 4A is a cross sectional view of the upper side mold 105 taken along line X0-X0 of FIG. 3. FIG. 4B is a cross sectional view of the upper side mold 105 taken along line X1-X1 of FIG. 3. FIG. 4C is a cross sectional view of the upper side mold 105 taken along line X2-X2 of FIG. 3. Each of reference symbols L0, L1, L2 and Lt denotes a light ray. The width of each of lines indicating light rays L0, L1, L2 and Lt indicates the amount of the light ray.

The electrode sections 104a are held by the respective electrode holders 103e in a cover area S formed by the lower frame 103c and the upper side mold 105 (and the lower side mold 106). That is, each of the upper side molds 105 serves as the cover member having a function for shielding the edge portions (electrode sections 104a) of the fluorescent tubes 104 from the diffusion area D by means of the shield plate 105a. A feeder (not shown) supplies power to the electrode sections 104a present in the cover area S and the light emitting section 104b of each fluorescent tube 104 emits light.

As described above, since the electrode holders 103e are arranged in the cover area S, the shield plate 105a (and the upper side molds 105) has a function for shielding the electrode holders 103e from the diffusion area D (the electrode holders 103e cannot be viewed from the display area of the liquid crystal display device 1 (refer to FIG. 1)).

In addition, the lower side molds 106 are arranged in the respective cover areas S. The electrode holders 103e are fixed to the lower side molds 106. Each of the lower side molds 106 is arranged to cover the bottom surface 103d of the lower frame 103c, and is an insulating member to insulate an electrical connection between each of the electrode sections 104 and the lower frame 103c. Each of the lower side molds 106 is therefore formed of a material (such as resin) having a high insulating property.

Since it is necessary that the liquid crystal display device 1 (refer to FIG. 1) according to the first embodiment have a small thickness measured in the front-back direction, the backlight device 103 needs to have a small thickness measured in the front-back direction. It is therefore necessary that the light source unit 103a have a small thickness measured in the front-back direction. As shown in FIG. 4A, a sufficient space for storing the electrode holders 103e is ensured in the cover area S, while the shield plates 105a are formed to reflect light emitted by the light emitting sections 104b toward the diffuser board 103b and extend from edge portions of the respective upper surfaces 105b to the bottom surface 103d of the lower frame 103c. The surface of each of the shield plates 105a is inclined with respect to the bottom surface 103d.

The thus constructed upper side molds 105 shield the electrode sections 104a of the fluorescent tubes 104 from the diffusion area D. When EEFLs are used as the fluorescent tubes 104 because of the small thickness of the light source unit 103a as described above, a portion of each of the electrode sections 104a (which is composed of a conductive material such as metal) is present in the diffusion area D as shown in FIG. 4A (a dark portion of each of the fluorescent tubes, at which the intensity of emitted light is low, is present in the diffusion area D when CCFLs or HCFLs are used as the fluorescent tubes 104).

Since the electrode sections 104a do not emit light, portions of the diffuser board 103b, which are present in the vicinities of the respective electrode sections 104a, are not illuminated sufficiently.

A description will be made of the structure shown in FIG. 4A. The darkness of an area present around the electrode section 104a is caused by an insufficient amount of light received by the diffuser board 103b from the electrode section 104a. Since the electrode section 104a does not emit light, light L2 received by the diffuser board 103b from the electrode section 104a is obtained by reflecting light L0 emitted by the light emitting section 104b on the electrode section 104a at least once.

FIG. 4A shows an example of propagation of the light L0 emitted by the light emitting section 104b from the electrode section 104a to the diffuser board 103b. A part (light Lt shown in FIG. 4A) of the light L0 emitted by the light emitting section 104b is transmitted by the diffuser board 103b. The remaining part (light L1 shown in FIG. 4A) of the light L0 is reflected on the diffuser board 103b. Light obtained by reflecting the light L1 on the electrode section 104a is indicated by reference symbol L2. The amount of the light L2 received by the diffuser board 103b from the electrode section 104a is small since the light L0 emitted by the light emitting section 104b is divided into the transmitted light Lt and the reflected light L1, and the electrode section 104a has low reflectance.

Next, a description will be made of propagation of light shown in FIG. 4B. Since the overhanging portion 105e0 has higher reflectance than that of the electrode section 104a and is provided above the electrode section 104a, light L1 reflected on the diffuser board 103b is reflected on the overhanging portion 105e0 with a lower loss than that of the light L1 reflected on the electrode section 104a. The amount of light L2 received by the diffuser board 103b from the electrode section 104a in the case of the configuration shown in FIG. 4B is therefore larger than that of the light L2 in the case where the overhanging portion 105e0 is absent as shown in FIG. 4A.

Next, a description will be made of propagation of light shown in FIG. 4C. In the configuration shown in FIG. 4C, light L0 emitted by the light emitting section 104b is directly reflected on the reflector 105e. Light L2 is then obtained by the reflection of the light L0. The light L2 reaches the diffuser board 103b from the vicinity of the electrode section 104a. In the case of the configuration shown in FIG. 4C, the light L0 emitted by the light emitting section 104b is not reflected on the diffuser board 103b before the light L0 is reflected in the vicinity of the electrode section 104a. The amount of the light L2 received by the diffuser board 103b from the vicinity of the electrode section 104a in the case of the configuration shown in FIG. 4C is therefore larger than that of the light L2 in the case of the configuration shown in FIG. 4B.

As described above, the reflector 105e allows a large amount of light to be reflected in the vicinity of the electrode section 104a. The reflector 105e provides an effect to suppress irregularity due to a black smear (or a reduction of luminance of light) in the vicinity of the electrode section 104a.

In the case where the reflector 105e is absent (only the overhanging portion 105e0 is present) as shown in FIG. 4B, the reflective surface (provided on the front side of the liquid crystal panel 120) of the overhanging portion 105e0 is substantially parallel to a longitudinal axis of the fluorescent tube 104. Therefore, the light L0 emitted by the light emitting section 104b is almost not reflected directly. The effect (in which the light L2 reaches the diffuser board 103b) in the case of the configuration shown in FIG. 4B is smaller than that in the case where the reflector 105e is present.

As shown in FIG. 4C, each of the reflectors 105e is integrated with the upper side mold 105. The reflectors 105e may be removable from the upper side mold 105.

Modification

Figure 5A:
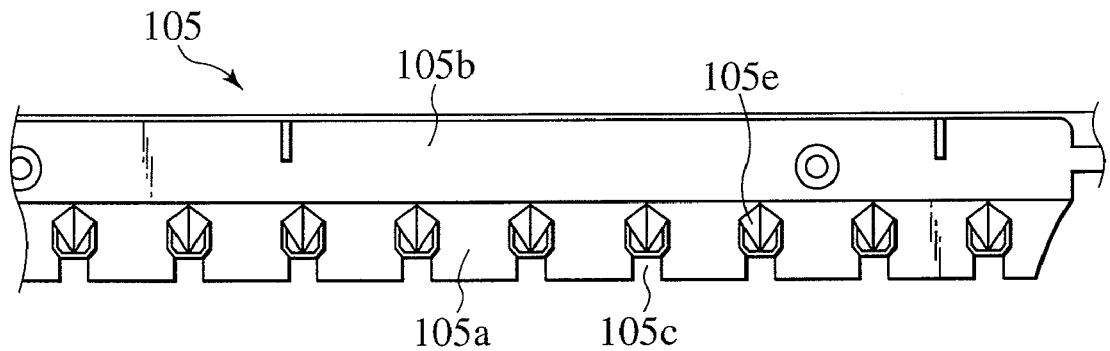
FIGS. 5A and 5B are cross sectional views of a reflector of the back light device according to the first embodiment of the present invention.
Figure 5B:
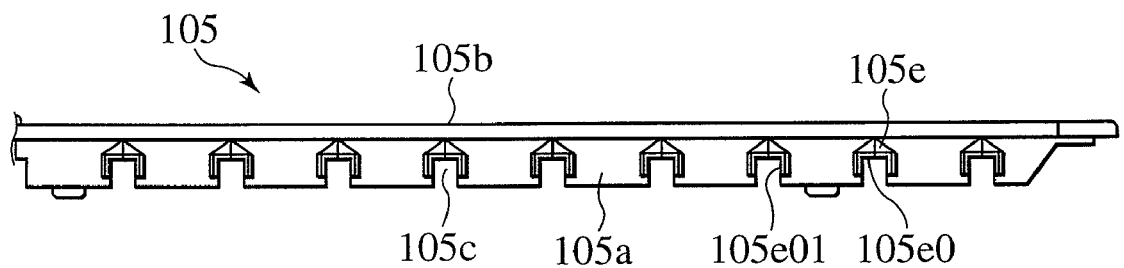
Figure 5C:
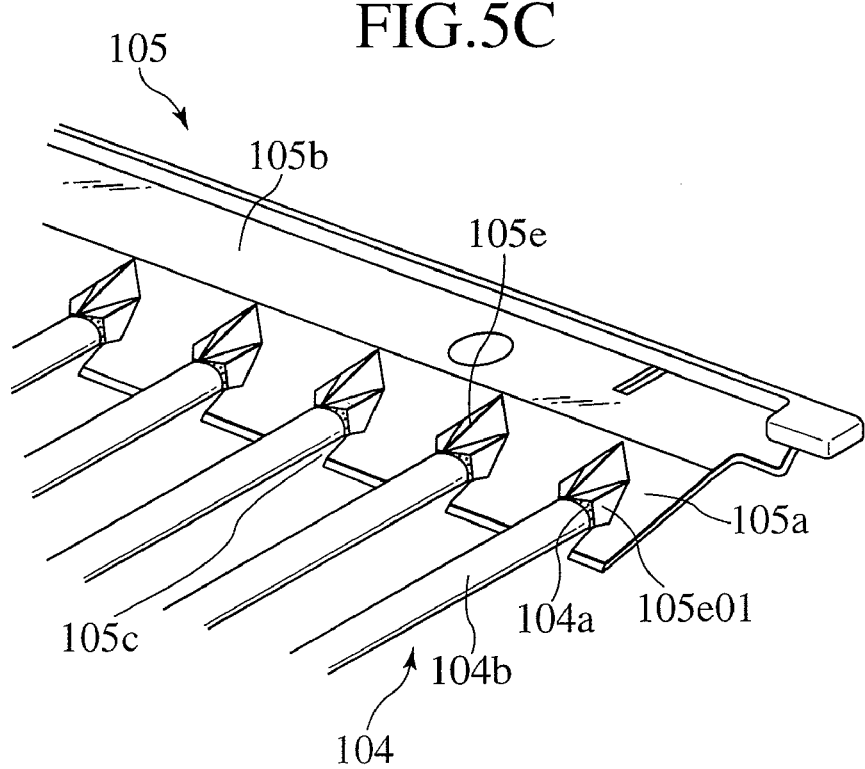
FIG. 5C is a perspective view of the reflector of the back light device according to the first embodiment of the present invention.

Next, a description will be made of a modification of the upper side molds 105 with reference to FIGS. 5A to 5C. FIG. 5A shows one of the upper side molds 105 when viewed from the front side. FIG. 5B shows the one of the upper side molds 105 when viewed from the left side. FIG. 5C is a perspective view of the upper side mold 105 with the fluorescent tubes 104 attached thereto. In the modification of the upper side mold 105, overhanging portions 105e01 are provided on the top side and the bottom side of each of the electrode sections 104a, in addition to the overhanging portion 105e0 provided above each of the electrode sections 104a. The overhanging portions 105e01, which have higher reflectance than the electrode sections 104a, provided on the top side and the bottom side of each of the electrode sections 104a make it possible to suppress losses of reflections of light incident on each of the electrode sections 104a from the top-bottom direction.

The surfaces of the overhanging portions 105e01 are substantially perpendicular to the display surface of the liquid crystal panel 120. The surfaces of the overhanging portions 105e0 are substantially parallel to the display surface of the liquid crystal panel 120. Each of the overhanging portions 105e0 extends more toward the inside of the case and in the direction of the longitudinal axis of the fluorescent tube 104 than the overhanging portions 105e01.

In the actual product, the fluorescent tubes 104 may move within a constant margin in the right-left direction. In order to prevent the electrode sections 104a from being viewed from the side of the liquid crystal panel 120 even when the fluorescent tubes 104 move, the overhanging portions 105e0 are designed to cover portions (each having a length of approximately 1 mm) of the respective light emitting sections 104b.

If the overhanging portions 105e01 cover the light emitting sections 104b, the number of propagation paths of light emitted by the covered light emitting section 104b to the diffusion area D is significantly reduced. Therefore, the overhanging portions 105e01 do not cover the light emitting sections 104b.

If the electrode section 104a can be viewed from the side of the liquid crystal panel 120, an area (of the display surface of the liquid crystal panel 120) around the electrode section 104a may be perceived as irregularity. Therefore, the overhanging portions 105e0 are preferentially designed to cover the portions (with a length of approximately 1 mm) of the respective light emitting sections 104b.

Second Embodiment

Figure 6A:
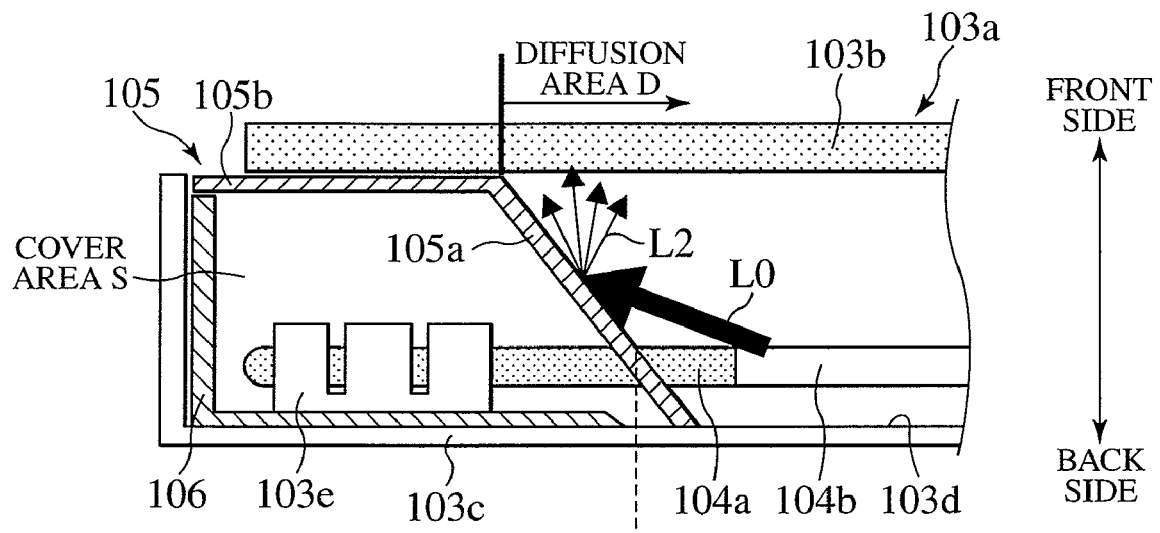
FIGS. 6A and 6B are diagrams each showing the cross sectional structure of a back light device according to a second embodiment of the present invention.
Figure 6B:
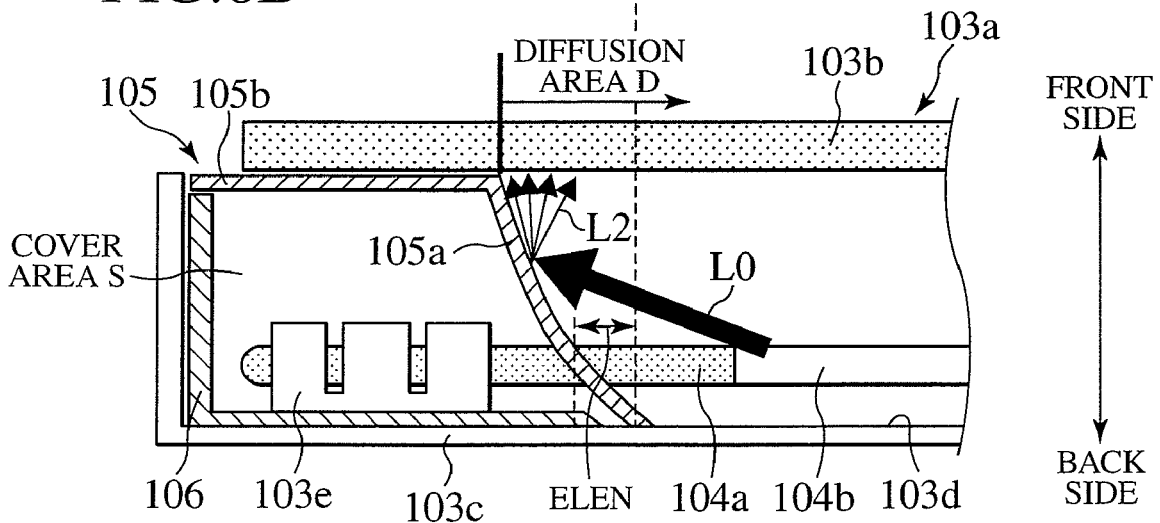

A description will be made of a second embodiment of the present invention with reference to FIGS. 6A and 6B. FIGS. 6A and 6B are cross sectional views taken along line Y-Y of FIG. 3. FIG. 6A shows the case where the shield plate 105a is linear. FIG. 6B shows the case where the shield plate 105a is bent toward the back side direction. In FIGS. 6A and 6B, propagation of light is shown. In the case where the shield plate 105a is bent toward the back side direction as shown in FIG. 6B, the diffusion area D in the case shown in FIG. 6B is larger than that in the case shown in FIG. 6A. The amount of light L0 received by edge regions of the diffusion area D in the case shown in FIG. 6B is larger than that of light L0 received by the edge regions of the diffusion area D in the case shown in FIG. 6B. A large amount of light L2 is illuminated on the edge regions of the diffusion area D. This allows the edge regions of the diffusion area D to be bright although the edge regions of the diffusion area D may be dark when the thickness of the backlight device 103 is reduced.

However, in the case where the shield plate 105a is bent toward the back side direction as shown in FIG. 6B, the electrode sections 104a protrude more toward the diffusion area D than those in the case shown in FIG. 6A (by a distance ELEN as shown in FIG. 6B). The reflectors 105e as described in the first embodiment are more important in the case where the shield plate 105a is bent toward the back side direction as shown in FIG. 6B than in the case shown in FIG. 6A.

In the configuration in which the shield plate 105a is bent toward the back side direction in the cross section of the shield plate 105a taken along a plane including a portion of the shield plate 105a present between the fluorescent tubes 104, the reflectors 105e are arranged for the respective fixed grooves 105c. This configuration allows the edge regions of the diffusion area D to be bright although the edge regions of the diffusion area D may be dark when the thickness of the backlight device 103 is reduced. Also, the configuration makes it possible to suppress a reduction of luminance of light in areas around the electrode sections 104a. Specifically, the configuration makes it possible to increase the amount of light to be illuminated on the edge regions of the diffusion area D which are present between the fluorescent tubes 104 and the amount of light to be illuminated on portions of the diffuser board 103b which are present around the fixed grooves 105c simultaneously.

The shield plate 105a has three-dimensional shapes around the fixed grooves 105c described in the present embodiment. That is, each three-dimensional shape of the shield plate 105a includes a surface constituting the overhanging portion and two surfaces (reflectors 105e) for reflecting light output from the fluorescent tube 104 to the diffuser board 103b. The present invention is not limited to the abovementioned three-dimensional shape. The reflectors 105e may have a quadrangular pyramid shape, a circular cone shape, or a multi-sided shape. The two surfaces of each reflector 105e may be a free-form curved surface. A corner of each reflector 105e may be curved.

The following is described about various modifications.

Second Modification

Figure 7A:
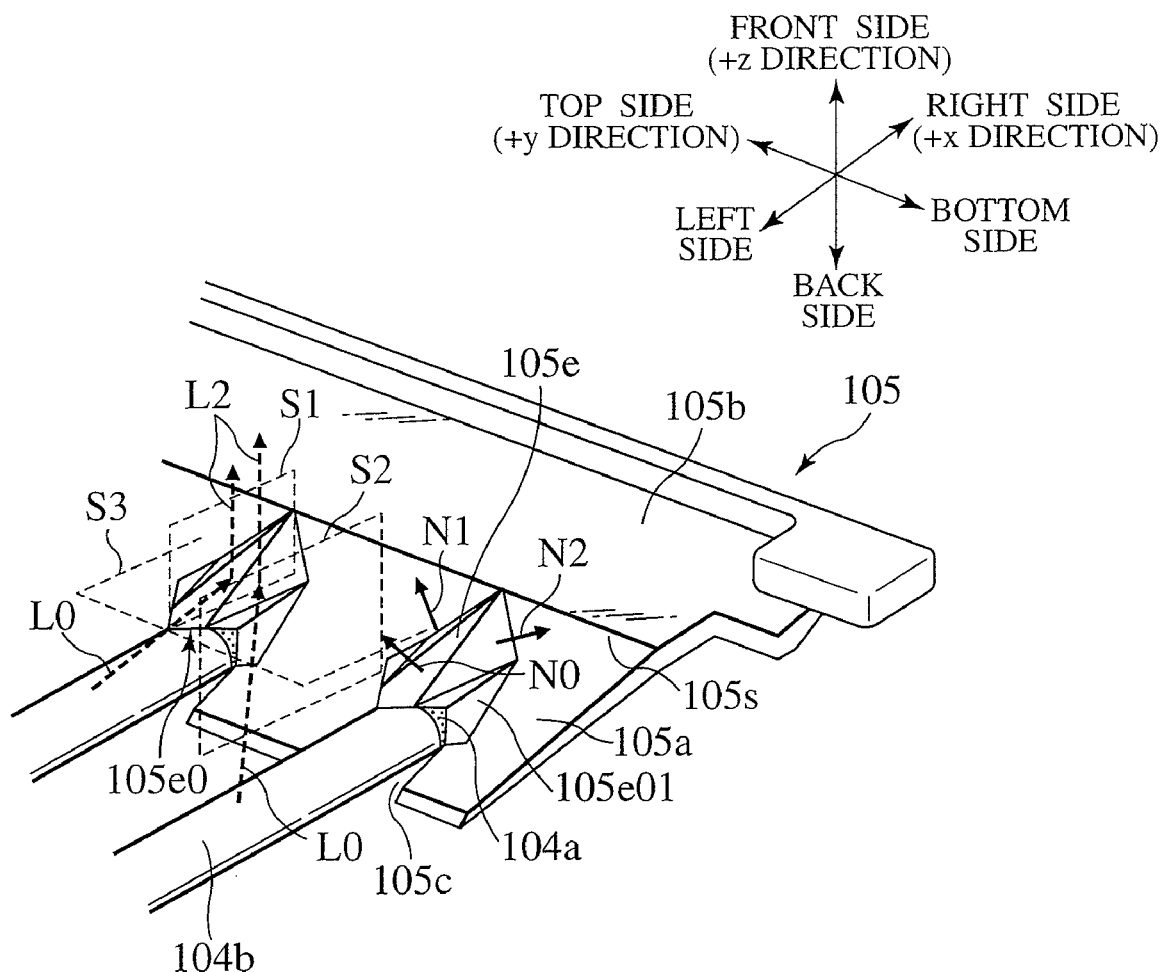
FIGS. 7A and 7B are diagrams each showing a reflector of the back light device according to a modification of the second embodiment of the present invention.
Figure 7B:
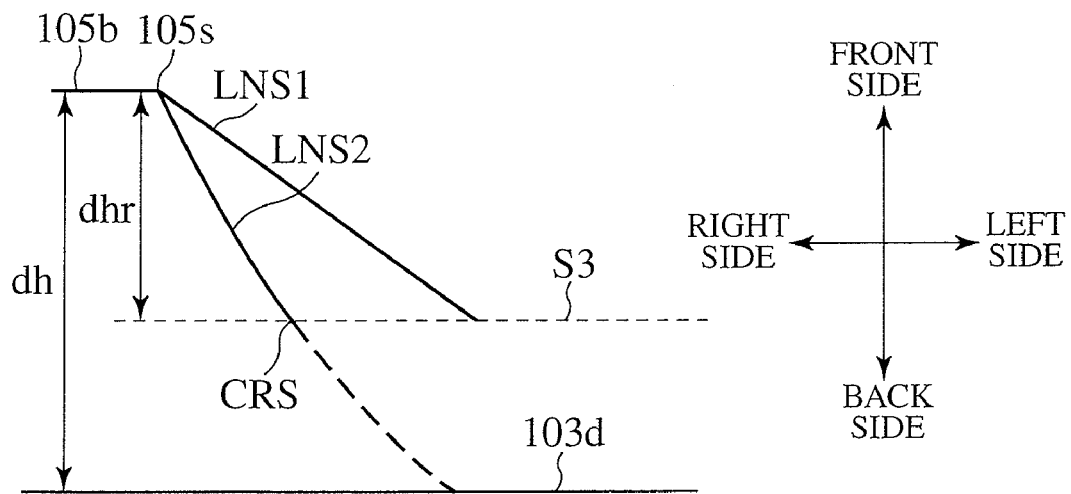

A description will be made of a modification of the reflectors 105e with reference to FIGS. 7A and 7B. FIG. 7A is a perspective view of the upper side mold 105 according to the second modification. The same reference numerals and symbols shown in FIGS. 7A and 7B as those in the abovementioned embodiments indicate the same parts and portions as those in the abovementioned embodiments unless otherwise stated. FIGS. 7A and 7B only show parts and portions related to the second modification.

In FIG. 7A, a plane S1 indicated by a dashed line includes the overhanging portion 105e0 and is perpendicular to the display surface of the liquid crystal panel 120 (and the bottom surface 103d of the lower frame 103c). A plane S2 indicated by a dashed line includes a portion of the shield plate 105a, which is present between the fluorescent tubes 104 adjacent to each other. The plane S2 is perpendicular to the display surface of the liquid crystal panel 120 (and the bottom surface 103d of the lower frame 103c). A plane S3 indicated by a dashed line includes the overhanging portion 105e0 and is parallel to the display surface of the liquid crystal panel 120 (and the bottom surface 103d of the lower frame 103c). In order to simplify the following description, the right-left direction is defined as the X direction (the right side direction is defined as a positive direction), the top-bottom direction is defined as the Y direction (the top side direction is defined as a positive direction), and the front-back direction is defined as the Z direction (the front side direction is defined as a positive direction). Three dimensional Cartesian coordinates are defined. The planes S1 and S2 are parallel to the X-Z plane. The plane S1 includes an area present around the center of the fluorescent tube 104 covered with the reflector 105e. In this case, the center of the fluorescent tube 104 is determined in the cross section of the fluorescent tube 104 taken along the Y-Z plane. The plane S3 is parallel to the X-Y plane.

The shield plate 105a near the fixed grooves 105c shown in FIG. 7A has a three-dimensional shape with three reflective surfaces constituting one of the reflectors 105e and a surface facing the electrode section 104a. The surface (of the shield plate 105a) facing the electrode section 104a corresponds to the overhanging portion 105e0.

The reference symbols N0, N1 and N2 denote normals to the three reflective surfaces. The normal N0 does not have a component or has a small component in the Y direction. The directions of the normals N1 and N2 are symmetrical to the plane S1. This results from the fact that the reflector 105e is symmetrical to the plane S1.

Accordingly, the reflector 105e is symmetrical to the plane S1, which includes the center of the fluorescent tube 104 (which is determined in the cross section of the fluorescent tube 104 taken along the Y-Z plane) covered with the reflector 105e and is perpendicular to the bottom surface 103d and parallel to the longitudinal axis (in the X direction) of the fluorescent tube 104. The symmetrical shape of the reflector 105e makes it possible to reflect light output from two fluorescent tubes 104 adjacent to the fluorescent tube 104 covered with the reflector 105e toward the diffuser board 103b (each of the fluorescent tubes 104 located on the topmost and bottommost sides is adjacent to one of the fluorescent tubes 104).

The present invention has a feature in which the cross sectional shape of a portion of the cover member taken along the plane S1 and located on the side of liquid crystal panel 120 with respect to the plane S3 is different from the cross sectional shape of a portion of the cover member taken along the plane S2 and located on the side of liquid crystal panel 120 with respect to the plane S3. In this case, the plane S1 is perpendicular to the display surface of the liquid crystal panel 120, the plane S2 includes a portion of the shield plate (which is present between the fluorescent tubes 104 adjacent to each other) and is perpendicular to the display surface of the liquid crystal panel 120, and the plane S3 includes the overhanging portion and is parallel to the display surface of the liquid crystal panel 120.

Dashed lines L0 and L2 shown in FIG. 7A denote light output from the light emitting section 104b and light reflected on the reflector 105e and directed to the diffuser board 103b, respectively. Light output from the light emitting section 104b is reflected on the reflector 105e as described in the first embodiment and directly reaches the diffuser board 103b to suppress the darkness of an area present around the electrode section 104a.

FIG. 7B shows a cross sectional shape of the reflector 105e. Reference symbol LNS1 shown in FIG. 7B indicates the cross sectional shape of the reflector 105e (shield plate 105a) taken along the plane S1. Reference symbol LNS2 shown in FIG. 7B indicates the cross sectional shape of the shield plate 105a taken along the plane S2. Reference symbol 105s indicates a boundary between the surface of the shield plate 105a and the upper surface 105b of the upper side mold 105. The cross sectional shape LNS2 is indicated by a dashed line and a solid line. The dashed line indicative of the cross sectional shape LNS2 shows the shape of the shield plate 105a, which is located on the back side with respect to the plane S3.

The cross sectional shape LNS1 formed on the front side with respect to the plane S3 is different from the cross sectional shape LNS2 formed on the front side with respect to the plane S3. In addition, a portion of the upper side mold 105 having the cross sectional shape LNS1 has a protrusion extending more toward the front side than a portion of the upper side mold 105 having the cross sectional shape LNS2 due to the presence of the reflector 105e. This results from the fact that portions of the shield plate 105a located on the front side with respect to the respective overhanging portions 105e0 are not flat, and the reflectors 105e for reflecting light are provided on the front side with respect to the respective overhanging portions 105e0.

Reference symbol dh indicates a distance between the bottom surface 103d of the lower frame 103c and the upper surface 105b of the upper side mold 105. When it is assumed that the distance dh is 10 mm and the diameter of an EEFL used as the fluorescent tube 104 is 3.0 mm, a distance dhr between the plane S3 and the upper surface 105b is approximately from 3 mm to 5 mm. The reflector 105e therefore has a length of approximately from 3 mm to 5 mm in the Z direction. The reflector 105e has a length of approximately from 2 mm to 10 mm in the X direction. The length of the reflector 105e in the X direction is varied depending on the length of the electrode section 104a in the longitudinal axis of the corresponding fluorescent tube 104 and the outer shape of the lower frame 103c. The present invention, however, is not limited to the abovementioned dimensions.

In the configuration shown in FIGS. 7A and 7B, each of the overhanging portions 105e0 substantially parallel to the display surface of the liquid crystal panel 120 protrudes more toward the inside of the case and in the direction of the longitudinal axis of the corresponding fluorescent tube 104 than the overhanging portions 105e01 substantially perpendicular to the display surface of the liquid crystal panel 120.

In the actual product, the fluorescent tubes 104 may move within a constant margin in the right-left direction. In order to prevent the electrode sections 104a from being viewed from the side of the liquid crystal panel 120 even when the fluorescent tubes 104 move, the overhanging portions 105e0 are designed to cover respective portions (each having a length of approximately 1 mm) of the light emitting sections 104b.

If the overhanging portions 105e01 cover the light emitting sections 104b, the number of propagation paths of light emitted by the covered light emitting section 104b to the diffusion area D is significantly reduced. Therefore, the overhanging portions 105e01 do not cover the light emitting sections 104b.

If the electrode section 104a can be viewed from the side of the liquid crystal panel 120, an area (of the display surface of the liquid crystal panel 120) around the electrode section 104a may be perceived as irregularity. Therefore, the overhanging portions 105e0 are preferentially designed to cover the portions (with a length of approximately 1 mm) of the respective light emitting sections 104b.

Third Modification

Figure 8A:
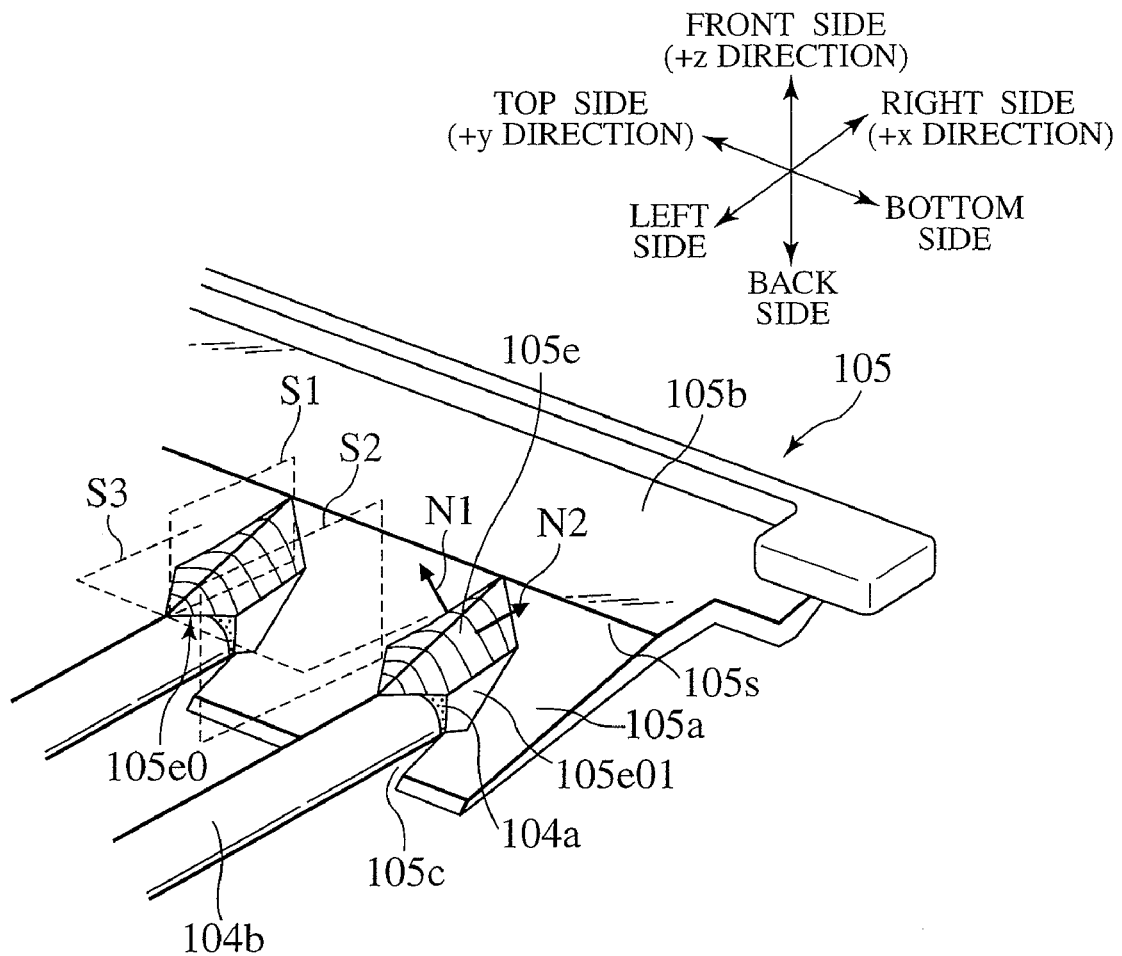
FIGS. 8A and 8B are diagrams each showing a reflector of the back light device according to another modification of the second embodiment of the present invention.
Figure 8B:
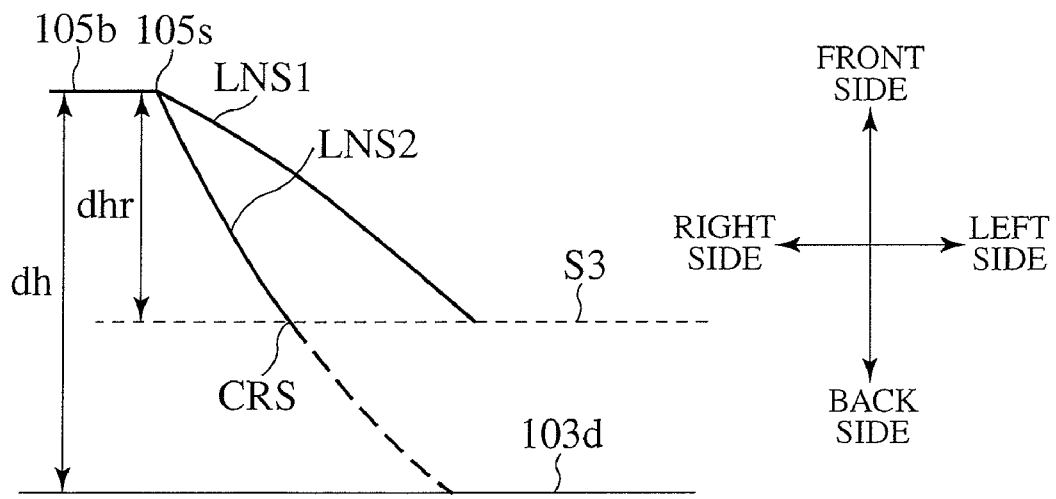

A description will be made of another modification of the reflector 105e with reference to FIGS. 8A and 8B. FIG. 8A is a perspective view of the upper side mold 105 according to the third modification. The feature of the third modification is that the reflector 105e has a free-form curved surface in place of a plurality of reflective surfaces. The essential feature of the third modification, however, is described above in the second modification. In FIG. 8A, the reflectors 105e are drawn by a simplified wire frame drawing method. The same reference numerals and symbols shown in FIGS. 8A and 8B as those in the abovementioned embodiments indicate the same parts and portions as those in the abovementioned embodiments unless otherwise stated. FIGS. 8A and 8B only show parts and portions related to the third modification.

The reflector 105e according to the third modification is symmetrical to the plane S1. Reference symbols N1 and N2 shown in FIG. 8A indicate normals to surfaces of the reflector 105e. The directions of the normals N1 and N2 are symmetrical to the plane S1.

Accordingly, the reflector 105e is symmetrical to the plane S1, which includes the center of the fluorescent tube 104 covered with the reflector 105e (the center of the fluorescent tube 104 is determined in the cross section of the fluorescent tube 104 taken along the Y-Z plane) and is perpendicular to the bottom surface 103d and parallel to the longitudinal axis (in the X direction) of the fluorescent tube 104. The symmetrical shape of the reflector 105e makes it possible to reflect light output from two fluorescent tubes 104 adjacent to the fluorescent tube 104 covered with the reflector 105e toward the diffuser board 103b (each of the fluorescent tubes 104 located on the topmost and bottommost sides is adjacent to one of the fluorescent tubes 104).

FIG. 8B shows a cross sectional shape of the reflector 105e according to the third modification. Reference symbol LNS1 shown in FIG. 8B indicates the cross sectional shape of the reflector 105e (shield plate 105a) taken along the plane S1. Reference symbol LNS2 shown in FIG. 8B indicates the cross sectional shape of the shield plate 105a taken along the plane S2. Reference symbol 105s indicates a boundary between the surface of the shield plate 105a and the upper surface 105b of the upper side mold 105. The cross sectional shape LNS2 is indicated by a dashed line and a solid line. The dashed line indicative of the cross sectional shape LNS2 shows the shape of the shield plate 105a, which is located on the back side with respect to the plane S3.

The cross sectional shape LNS1 formed on the front side with respect to the plane S3 is different from the cross sectional shape LNS2 formed on the front side with respect to the plane S3 in the third modification. In the third modification, a portion of the upper side mold 105 having the cross sectional shape LNS1 has a protrusion extending more toward the front side than a portion of the upper side mold 105 having the cross sectional shape LNS2 due to the presence of the reflector 105e. This results from the fact that portions of the shield plate 105a located on the front side with respect to the respective overhanging portions 105e0 are not flat, and the reflectors 105e for reflecting light are provided on the front side with respect to the respective overhanging portions 105e0.

Reference symbol dh shown in FIG. 8B indicates a distance between the bottom surface 103d of the lower frame 103c and the upper surface 105b of the upper side mold 105. When it is assumed that the distance dh is 10 mm and the diameter of an EEFL used as the fluorescent tube 104 is 3.0 mm, a distance dhr between the plane S3 and the upper surface 105b is approximately from 3 mm to 5 mm. The reflector 105e therefore has a length of approximately from 3 mm to 5 mm in the Z direction. The reflector 105e has a length of approximately from 2 mm to 10 mm in the X direction. The length of the reflector 105e in the X direction is varied depending on the length of the electrode section 104a in the longitudinal axis of the corresponding fluorescent tube 104 and the outer shape of the lower frame 103c. The present invention, however, is not limited to the abovementioned dimensions.

Fourth Modification

Figure 9A:
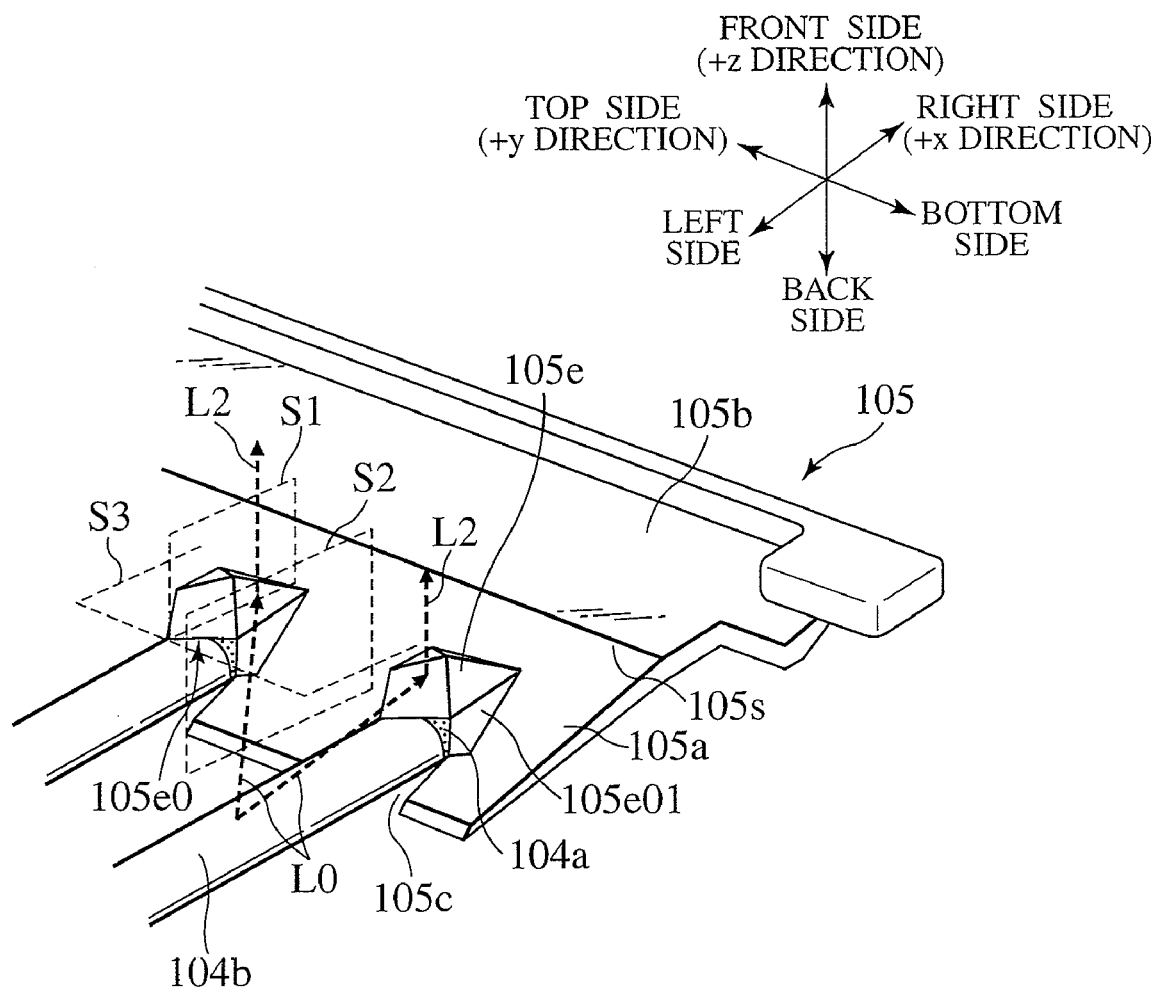
FIGS. 9A and 9B are diagrams each showing a reflector of the back light device according to still another modification of the second embodiment of the present invention.
Figure 9B:
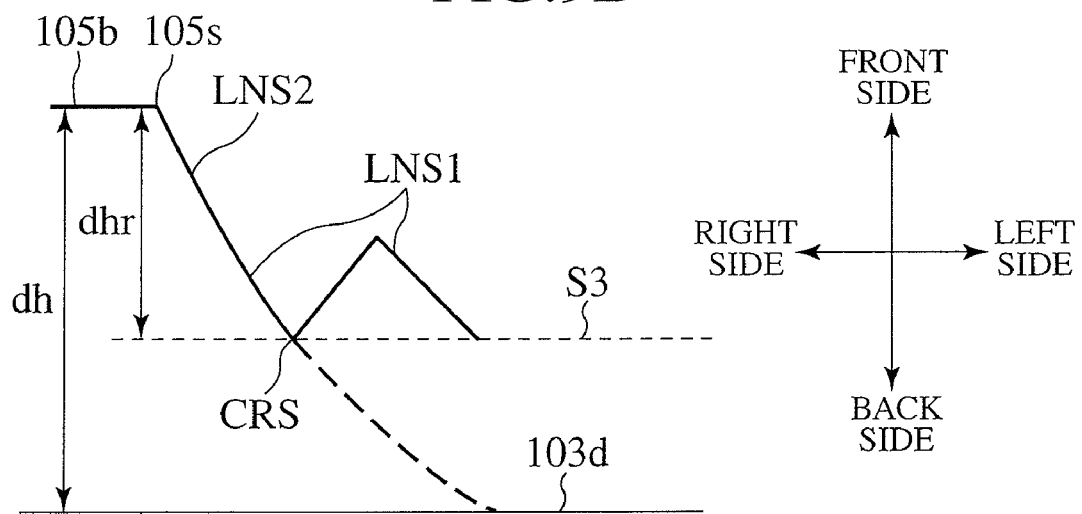

A description will be made of still another modification of the reflector 105e with reference to FIGS. 9A and 9B. FIG. 9A is a perspective view of the upper side mold 105 according to the fourth modification. The feature of the fourth modification is that protrusions each having a pyramidal shape are provided as the reflectors 105e on the front side with respect to the respective overhanging portions 105e0. The pyramidal shape of each of the protrusions may be replaced with a multi-sided shape or a circular cone shape. The same reference numerals and symbols shown in FIGS. 9A and 9B as those in the abovementioned embodiments indicate the same parts and portions as those in the abovementioned embodiments unless otherwise stated. FIGS. 9A and 9B only show parts and portions related to the fourth modification.

A method for increasing a brightness level of areas present around the electrode sections 104a is essentially the same as that in the first embodiment. Light L0 output from the light emitting sections 104b is reflected on the reflectors 105e, and light L2 obtained by the reflection of the light L0 is then illuminated on the diffuser board 103b to increase brightness levels of areas present around the electrode sections 104a.

A cross sectional shape of the reflector 105e will be described with reference to FIG. 9B. Reference symbol LNS1 shown in FIG. 9B indicates the cross sectional shape of the reflector 105e (shield plate 105a) taken along the plane S1. Reference symbol LNS2 shown in FIG. 9B indicates a cross sectional shape of the shield plate 105a taken along the plane S2. Reference symbol 105s indicates a boundary between the surface of the shield plate 105a and the upper surface 105b of the upper side mold 105. The cross sectional shape LNS2 is indicated by a dashed line and a solid line. The dashed line indicative of the cross sectional shape LNS2 shows the shape of the shield plate 105a, which is located on the back side with respect to the plane S3.

A part of the cross sectional shape LNS1 formed on the front side with respect to the plane S3 is the same as a part of the cross sectional shape LNS2 formed on the front side with respect to the plane S3 in the fourth modification. Each of the reflectors 105e having the cross sectional shape LNS1 includes a portion protruding toward the front side. The protruding portion of each of the reflectors 105e is located on the left side with respect to a point CRS intersecting the cross sectional shape LNS2 and the plane S3 as shown in FIG. 9B.

Reference symbol dh shown in FIG. 9B indicates a distance between the bottom surface 103d of the lower frame 103c and the upper surface 105b of the upper side mold 105. When it is assumed that the distance dh is 10 mm and the diameter of an EEFL used as the fluorescent tube 104 is 3.0 mm, a distance dhr between the plane S3 and the upper surface 105b is approximately from 3 mm to 5 mm. The reflector 105e has a length of approximately from 2 mm to 4 mm in the Z direction. The reflector 105e has a length of approximately from 2 mm to 10 mm in the X direction. The length of the reflector 105e in the X direction is varied depending on the length of the electrode section 104a in the longitudinal axis of the corresponding fluorescent tube 104 and the outer shape of the lower frame 103c. The present invention, however, is not limited to the abovementioned dimensions.

Fifth Modification

Figure 12A:
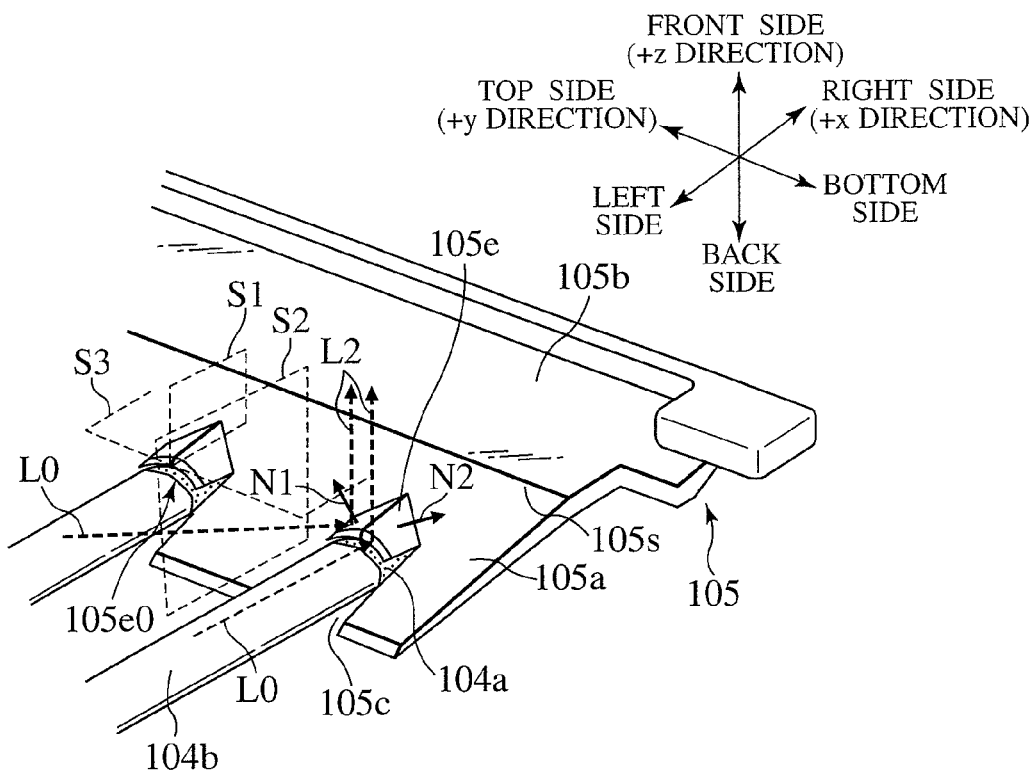
FIGS. 12A to 12C are a perspective view and cross sectional views of a reflector of the back light device according to still another modification of the second embodiment of the present invention.

A description will be made of still another modification of the reflector 105e with reference to FIGS. 12A to 12C. FIG. 12A is a perspective view of the upper side mold 105 according to the fifth modification. One of the features of the fifth modification is that each of the overhanging portions 105e0 has a curved shape when it is viewed from the left side (refer to FIG. 12C).

Figure 12B:
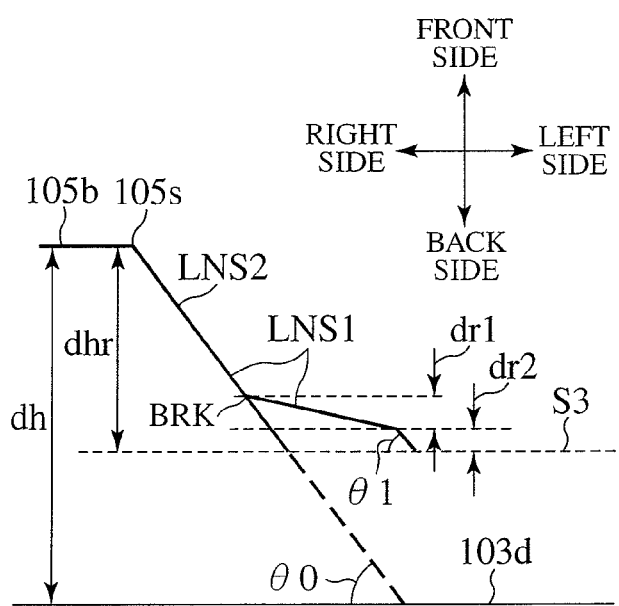
Figure 12C:
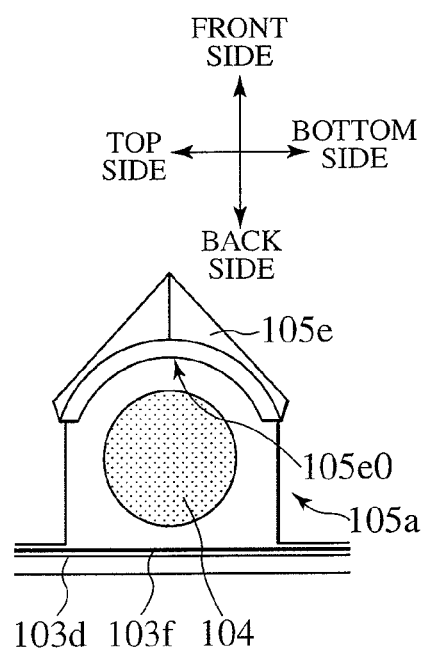

The same reference numerals and symbols shown in FIGS. 12A to 12C as those in the abovementioned embodiments indicate the same parts and portions as those in the abovementioned embodiments unless otherwise stated. FIGS. 12A to 12C only show parts and portions related to the fifth modification.

Each of the reflectors 105e according to the fifth modification is symmetrical to the plane S1. Reference symbols N1 and N2 shown in FIG. 12A indicate normals to surfaces of the reflector 105e. The directions of the normals N1 and N2 are symmetrical to the plane S1.

Accordingly, the reflector 105e is symmetrical to the plane S1, which includes the center of the fluorescent tube 104 covered with the reflector 105e (the center of the fluorescent tube 104 is determined in the cross section of the fluorescent tube 104 taken along the Y-Z plane) and is perpendicular to the bottom surface 103d and parallel to the longitudinal axis (in the X direction) of the fluorescent tube 104. The symmetrical shape of the reflector 105e makes it possible to reflect light output from two fluorescent tubes 104 adjacent to the fluorescent tube 104 covered with the reflector 105e toward the diffuser board 103b (each of the fluorescent tubes 104 located on the topmost and bottommost sides is adjacent to one of the fluorescent tubes 104).

A cross sectional shape of the reflector 105e will be described with reference to FIG. 12B. Reference symbol LNS1 shown in FIG. 12B indicates the cross sectional shape of the reflector 105e (shield plate 105a) taken along the plane S1. Reference symbol LNS2 shown in FIG. 12B indicates a cross sectional shape of the shield plate 105a taken along the plane S2. Reference symbol 105s indicates a boundary between the surface of the shield plate 105a and the upper surface 105b of the upper side mold 105. The cross sectional shape LNS2 is indicated by a dashed line and a solid line. The dashed line indicative of the cross sectional shape LNS2 shows the shape of the shield plate 105a, which is located on the back side with respect to the plane S3. The plane S3 has the same Z coordinate as that of a point intersecting the plane S1 and the overhanging portion 105e0.

A part of the cross sectional shape LNS1 formed on the front side with respect to the plane S3 is the same as a part of the cross sectional shape LNS2 formed on the front side with respect to the plane S3 in the fifth modification. The cross sectional shape LNS1 formed on the left side with respect to a point BRK is different from the cross sectional shape LNS2 formed on the left side with respect to the point BRK. The point BRK is a boundary between the surface of the shield plate 105a and the reflector 105e, and located on the plane S1.

A portion of the upper side mold 105 having the cross sectional shape LNS1 has a protrusion extending more toward the front side than a portion of the upper side mold 105 having the cross sectional shape LNS2. The protrusion is located on the left side with respect to the point BRK. This results from the fact that portions of the shield plate 105a located on the front side with respect to the overhanging portions 105e0 are not flat, and the reflectors 105e for reflecting light are provided on the front side with respect to the respective overhanging portions 105e0.

In the present embodiment, the portion of the shield plate 105a having the cross sectional shape LNS2 is not curved and is linear. An angle θ0 formed between the line of the cross sectional shape LNS2 and the bottom surface 103d is 45 degrees as shown in FIG. 12B. This results from the fact that when the angle θ0 is approximately 45 degrees, left and right edge portions of the diffuser board 103b (which are present around the upper side molds 105) exhibit the highest brightness level. It has been confirmed by an experiment that when the angle θ0 is approximately 45 degrees, the left and right edge portions of the diffuser board 103b exhibit the highest brightness level. This is because light propagating in a direction substantially parallel to the X direction is reflected on the upper side mold 105 at a right angle with respect to a direction of incidence of the light on the upper side mold 105 and directed to the diffuser board 103b (since the light reflected on the upper side mold 105 is scattered, all components of the light are not necessarily directed to the diffuser board 103b. It is however general that even when the reflected light is scattered, a large amount of components of the light are reflected in the specular direction. Therefore, a large amount of the light is reflected and directed to the diffuser board 103b when the angle θ0 is set to 45 degrees). Each of the reflectors 105e has a left side edge portion in the cross sectional shape LNS1. The surface of the left side edge portion of the reflector 105e and the plane S3 form an angle θ1. The angle θ1 is set to 45 degrees for the same reason as that for setting the angle θ0 to 45 degrees.

Reference symbol dh shown in FIG. 12B indicates a distance between the bottom surface 103d of the lower frame 103c and the upper surface 105b of the upper side mold 105. When it is assumed that the distance dh is 10 mm and the diameter of an EEFL used as the fluorescent tube 104 is 3.0 mm, a distance dhr between the plane S3 and the upper surface 105b is approximately from 3 mm to 5 mm. The reflector 105e according to the fifth modification has a length (which is the total of a distance dr1 and a distance dr2) of approximately from 1 mm to 5 mm in the Z direction. The left side edge portion of the reflector 105e has a length (which is the distance dr2) equal to or more than the minimum thickness (approximately 0.5 mm to 2 mm) of the upper side mold 105 that can be molded.

The length of each of the reflector 105e in the X direction is dependent on the length of the electrode section 104a in the longitudinal axis of the corresponding fluorescent tube 104 and the outer shape of the lower frame 103d. Each of the reflectors 105e has a length of 1 mm to 10 mm in the X direction. The present invention, however, is not limited to the dimensions of the reflector 105e in the X direction as described above. As described above, each of the reflectors 105e may be formed by combining the abovementioned shapes and modifiable.

Third Embodiment

Figure 10:
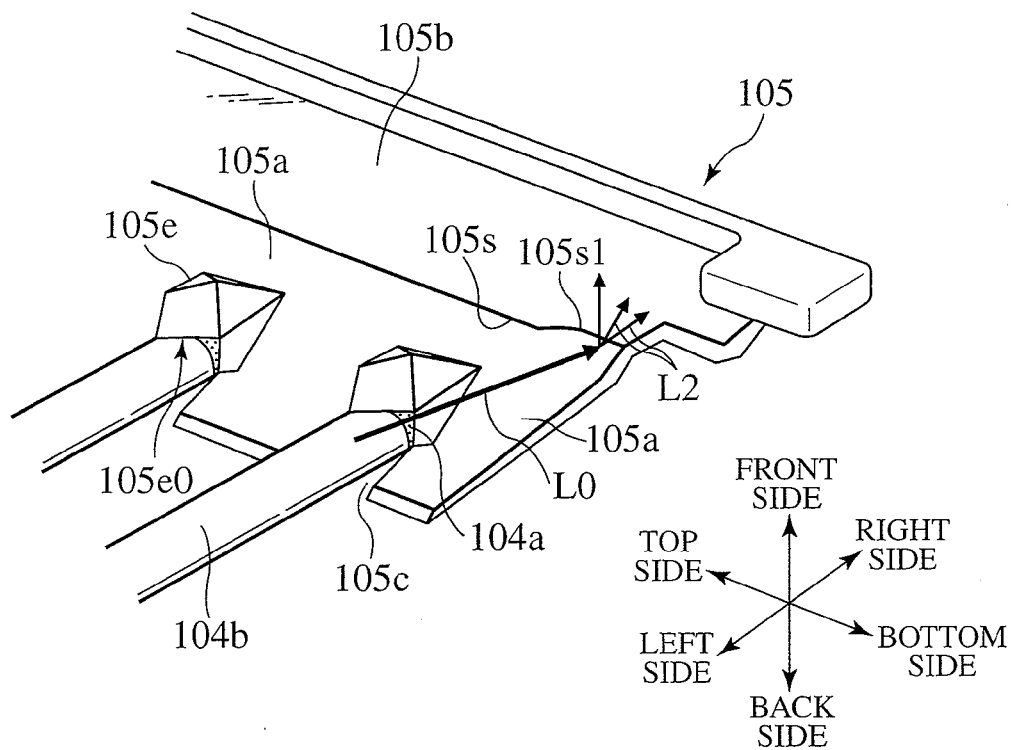
FIG. 10 is a diagram showing a reflector of a back light device according to a third embodiment of the present invention.

A description will be made of a third embodiment of the present invention with reference to FIG. 10. FIG. 10 is a perspective view of the upper side mold 105 according to the third embodiment. The same reference numerals and symbols shown in FIG. 10 as those in the abovementioned embodiments indicate the same parts and portions as those in the abovementioned embodiments unless otherwise stated. FIG. 10 only shows parts and portions related to the third embodiment.

The description of the present embodiment focuses on four corners of the liquid crystal panel 120, i.e., a top side edge portion and a bottom side edge portion of each of the upper side molds 105. FIG. 10 shows the bottom side edge portion of the upper side mold 105. The four corners of the liquid crystal panel 120 are regions to which it is most difficult to allow light to be transmitted. It is, therefore, necessary to take sufficient measures for the regions.

In the present embodiment, portions of the boundary 105s (between the surface of the shield plate 105a and the upper surface 105b of the upper side mold 105 present on the right side), which are present at the top side edge portion and the bottom side edge portion of the upper side mold 105 present on the right side, are shifted to the right side. Also, portions of the boundary 105s (between the surface of the shield plate 105a and the upper surface 105b of the upper side mold 105 present on the left side), which are present at the top side edge portion and the bottom side edge portion of the upper side mold 105 present on the left side, are shifted to the left side (refer to reference numeral 105s1 shown in FIG. 10). That is, portions of the boundary 105s are shifted such that the diffusion area D is increased. The shifting of the portions of the boundary 105s makes it possible to allow light to be transmitted to the four corners of the liquid crystal panel 120, thereby increasing brightness levels of the light at the four corners.

Fourth Embodiment

Figure 11:
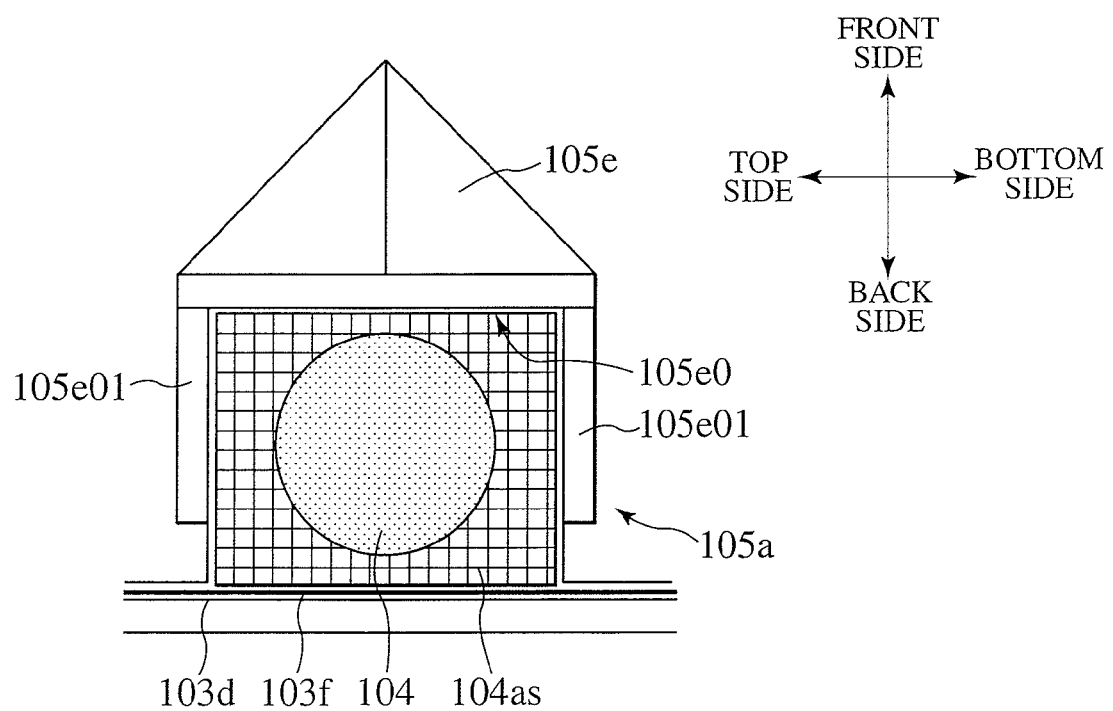
FIG. 11 is a cross sectional view of a reflector of a back light device according to a fourth embodiment of the present invention.

A description will be made of a fourth embodiment of the present invention with reference to FIG. 11. FIG. 11 shows the fourth embodiment. The same reference numerals and symbols shown in FIG. 11 as those in the abovementioned embodiments indicate the same parts and portions as those in the abovementioned embodiments unless otherwise stated. FIG. 11 only shows parts and portions related to the fourth embodiment. FIG. 11 is an enlarged view of the periphery of the overhanging portions of the upper side mold located on the right side when viewed from the left side.

The description of the present embodiment focuses on irregularity when a left region or a right region of the display surface of the liquid crystal panel 120 is viewed from a oblique direction (the left region or the right region of the display surface of the liquid crystal panel 120 is viewed from a direction forming an angle of 45 degrees or more with respect to the Z direction in the X-Z plane).

The irregularity may be caused by darkness of gaps present between the fluorescent tube 104 and the overhanging portions 105e0 and 105e01. The gaps present between the fluorescent tube 104 and the overhanging portions 105e0 and 105e01 are set to approximately 1 mm to prevent the fluorescent tube 104 and the overhanging portions 105e0 and 105e01 from being contacted with each other and broken due to thermal expansion of resin used for the upper side mold 105 or vibration during transportation of a liquid crystal module.

To solve this problem, a white elastic body 104as is provided in the gaps between the fluorescent tube 104 and the overhanging portions 105e0 and 105e01 as shown in FIG. 11.

The white elastic body 104as (provided in the gaps between the fluorescent tube 104 and the overhanging portions 105e0 and 105e01) reflects light to suppress the irregularity and serves as a cushion between the fluorescent tube 104 and the overhanging portions 105e0 and 105e01.

This technique is effective for EEFLs provided with electrode sections, each of which has low reflectance and is present in the outside (the diffusion area).

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A liquid crystal display device comprising:
a liquid crystal panel; and
a light source unit for illuminating the liquid crystal panel from a back side of the liquid crystal panel, wherein
the light source unit includes:
a case having an opening surface;
a fluorescent tube provided in the case and having a longitudinal axis;
an electrode holder provided in the case and holding an electrode section formed in an edge portion of the fluorescent tube; and
a cover member having a shield plate for shielding the electrode holder from a diffusion area in which light emitted by a light emitting section provided in the fluorescent tube is scattered, wherein
the cover member includes:
a fixed groove through which the fluorescent tube extends; and
an overhanging portion, which is provided at an edge of the fixed groove and on the side of the liquid crystal panel with respect to the fluorescent tube, faces the fluorescent tube, and protrudes toward the inside of the case and in the direction of the longitudinal axis of the fluorescent tube, and wherein
when a plane which includes the overhanging portion, is perpendicular to a surface of the liquid crystal panel, and is substantially parallel to the longitudinal axis of the fluorescent tube, is S1; a plane which includes a portion of the shield plate and is perpendicular to the surface of the liquid crystal panel is S2, the portion of the shield plate not including the overhanging portion; and a plane which includes the overhanging portion and is parallel to the surface of the liquid crystal panel is S3, a cross sectional shape of a portion of the cover member, which is taken along the plane S1 and located on the side of the liquid crystal panel with respect to the plane S3, is different from a cross sectional shape of a portion of the cover member, which is taken along the plane S2 and located on the side of the liquid crystal panel with respect to the plane S3, and the portion of the cover member, which has the cross sectional shape taken along the plane S1 and located on a front side of the plane S3 in a direction toward the liquid crystal panel, includes a protrusion which faces the liquid crystal panel and which extends closer to the liquid crystal panel than a surface portion of the overhanging portion which lies in the plane S3.

2. The liquid crystal display device according to claim 1, wherein
the protrusion includes a reflector having at least two reflective surfaces is provided for the fixed groove and located on a surface of the cover member and on the side of the liquid crystal panel with respect to the overhanging portion, and one of planes, each of which includes a boundary between the reflective surfaces and is perpendicular to the surface of the liquid crystal panel, includes an area present around the center of the fluorescent tube, the center of the fluorescent tube being determined in a cross section of the fluorescent tube taken along a plane perpendicular to the planes S1 and S3.

3. The liquid crystal display device according to claim 2, wherein
the reflective surfaces of the reflector are substantially symmetrical to the plane S1 including an area present around the center of the fluorescent tube, the center of the fluorescent tube being determined in a cross section of the fluorescent tube taken along a plane perpendicular to the planes S1 and S3, and wherein
the reflector is located on the surface of the cover member and on the side of the liquid crystal panel with respect to the overhanging portion.

4. The liquid crystal display device according to claim 1, wherein
the overhanging portion has a surface substantially parallel to the surface of the liquid crystal panel and a surface substantially perpendicular to the surface of the liquid crystal panel.

5. The liquid crystal display device according to claim 2, wherein
the portion of the cover member, which has the cross sectional shape taken along the plane S2, is bent toward the opposite side to the liquid crystal panel between the fluorescent tubes adjacent to each other.

6. The liquid crystal display device according to claim 1, wherein the fluorescent tube is an external electrode fluorescent lamp.

7. A liquid crystal display device comprising:
a liquid crystal panel; and
a light source unit for illuminating the liquid crystal panel from a back side of the liquid crystal panel, wherein
the light source unit includes:
a case having an opening surface;
a fluorescent tube provided in the case and having a longitudinal axis;
an electrode holder provided in the case and holding an electrode section formed in an edge portion of the fluorescent tube; and
a cover member having a shield plate for shielding the electrode holder from a diffusion area in which light emitted by a light emitting section provided in the fluorescent tube is scattered, wherein
the cover member includes:
a fixed groove through which the fluorescent tube extends; and
an overhanging portion, which is provided at an edge of the fixed groove and on the side of the liquid crystal panel with respect to the fluorescent tube, faces the fluorescent tube, and protrudes toward the inside of the case and in the direction of the longitudinal axis of the fluorescent tube, wherein the overhanging portion has a surface substantially parallel to a surface of the liquid crystal panel and a surface substantially transverse to the surface of the liquid crystal panel, and wherein the surface of the overhanging portion, which is substantially parallel to the surface of the liquid crystal panel, extends more toward the inside of the case and in the direction of the longitudinal axis of the fluorescent tube than the surface of the overhanging portion, which is substantially perpendicular to the surface of the liquid crystal panel.

8. The liquid crystal display device according to claim 1, wherein the protrusion includes a reflector provided on the side of the liquid crystal panel with respect to the overhanging portion and protrudes toward the liquid crystal panel.

9. A liquid crystal display device comprising:
a liquid crystal panel; and
a light source unit for illuminating the liquid crystal panel from a back side of the liquid crystal panel, wherein
the light source unit includes:
a case having an opening surface;
a fluorescent tube provided in the case and having a longitudinal axis;
an electrode holder provided in the case and holding an electrode section formed in an edge portion of the fluorescent tube; and
a cover member having a shield plate for shielding the electrode holder from a diffusion area in which light emitted by a light emitting section provided in the fluorescent tube is scattered, wherein
the cover member includes a fixed groove through which the fluorescent tube extends, wherein
the cover member has an upper surface substantially parallel to the surface of the liquid crystal panel and is present at locations around left and right edge portions of the liquid crystal panel, wherein
when sections present on the boundary between the upper surface and the shield plate of the cover member are defined as diffusion area start sections, at least one of the diffusion area start sections, which is present at top and bottom edge portions of the cover member, is located on the outer side of the case with respect to the other diffusion area start section present around the center of the boundary between the upper surface and the shield plate of the cover member.

10. The liquid crystal display device according to claim 1, wherein a white elastic body is provided between the overhanging portion and the fluorescent tube.

11. The liquid crystal display device according to claim 4, wherein the surface of the overhanging portion, which is substantially parallel to the surface of the liquid crystal panel, extends more toward the inside of the case and in the direction of the longitudinal axis of the fluorescent tube than the surface of the overhanging portion, which is substantially perpendicular to the surface of the liquid crystal panel.

12. The liquid crystal display device according to claim 1, wherein the protrusion extends closer to the liquid crystal panel than the portion of the cover member having the cross sectional shape taken along the plane S2 and located on the front side of the plane S3.

13. The liquid crystal display device according to claim 7, wherein the surface of the overhanging portion which is substantially transverse to the surface of the liquid crystal panel is substantially perpendicular to the liquid crystal panel.

14. The liquid crystal display device according to claim 1, wherein when sections present on a boundary between an upper surface of the cover member and the shield plate of the cover member are defined as diffusion area start sections, at least one of the diffusion area start sections, which is present at top and bottom edge portions of the cover member, is located on the outer side of the case with respect to the other diffusion area start section present around the center of the boundary between the upper surface and the shield plate of the cover member.

* * * * *